(12) United States Patent
Hasebe

(10) Patent No.: US 8,466,946 B2
(45) Date of Patent: Jun. 18, 2013

(54) IMAGE FORMING APPARATUS AND LIGHT INTENSITY CORRECTION METHOD

(75) Inventor: Takashi Hasebe, Sagamihara (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 699 days.

(21) Appl. No.: 12/624,340

(22) Filed: Nov. 23, 2009

(65) Prior Publication Data

US 2010/0128236 A1 May 27, 2010

(30) Foreign Application Priority Data

Nov. 25, 2008 (JP) ................................ 2008-299440

(51) Int. Cl.
*B41J 2/47* (2006.01)
*B41J 2/45* (2006.01)

(52) U.S. Cl.
USPC .......................................... 347/236; 347/246

(58) Field of Classification Search
USPC ......................................................... 347/236
See application file for complete search history.

(56) References Cited

U.S. PATENT DOCUMENTS

| | | | | |
|---|---|---|---|---|
| 5,586,055 | A * | 12/1996 | Ng et al. | 702/90 |
| 6,753,897 | B2 * | 6/2004 | Vazan | 347/237 |
| 7,253,828 | B2 * | 8/2007 | Ng et al. | 347/236 |
| 2007/0291101 | A1 * | 12/2007 | Hata et al. | 347/237 |

FOREIGN PATENT DOCUMENTS

| | | |
|---|---|---|
| JP | 2003-72140 | 3/2003 |
| JP | 2005-28726 | 2/2005 |
| JP | 2005-59356 | 3/2005 |
| JP | 2005059356 A * | 3/2005 |
| JP | 2008-114593 | 5/2008 |

OTHER PUBLICATIONS

Notification of Refusal with English language translation mailed by the Japanese Patent Office on Dec. 4, 2012, in counterpart Japanese application No. 2008-299440.

* cited by examiner

*Primary Examiner* — Omar Rojas
(74) *Attorney, Agent, or Firm* — Finnegan, Henderson, Farabow, Garrett & Dunner, L.L.P.

(57) ABSTRACT

Disclosed is an image forming apparatus including an optical writing device including, a light source section composed of a plurality of light emitting elements arranged in a main scanning direction; an optical section including a plurality of coupled lenses to form an image on a light exposure face by gathering light emitted from the light emitting elements; and a storage section to store first correction data for correcting the light intensity of the plurality of light emitting elements and second correction data for correcting an optical characteristic specific to the coupled lens, and a control section to read out the first correction data and the second correction data from the storage section of the optical writing device and to correct the first correction data based on the second correction data.

16 Claims, 21 Drawing Sheets

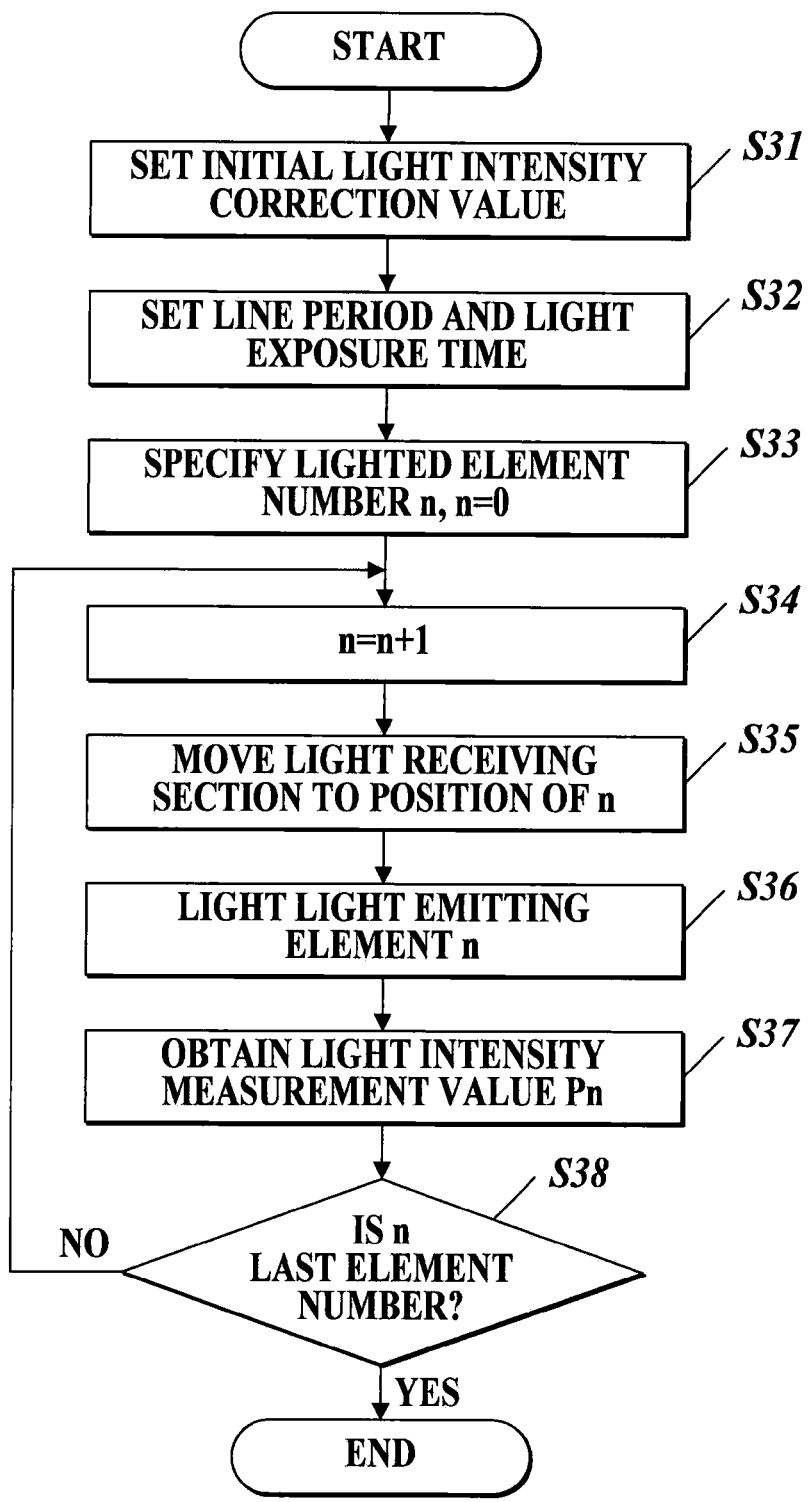

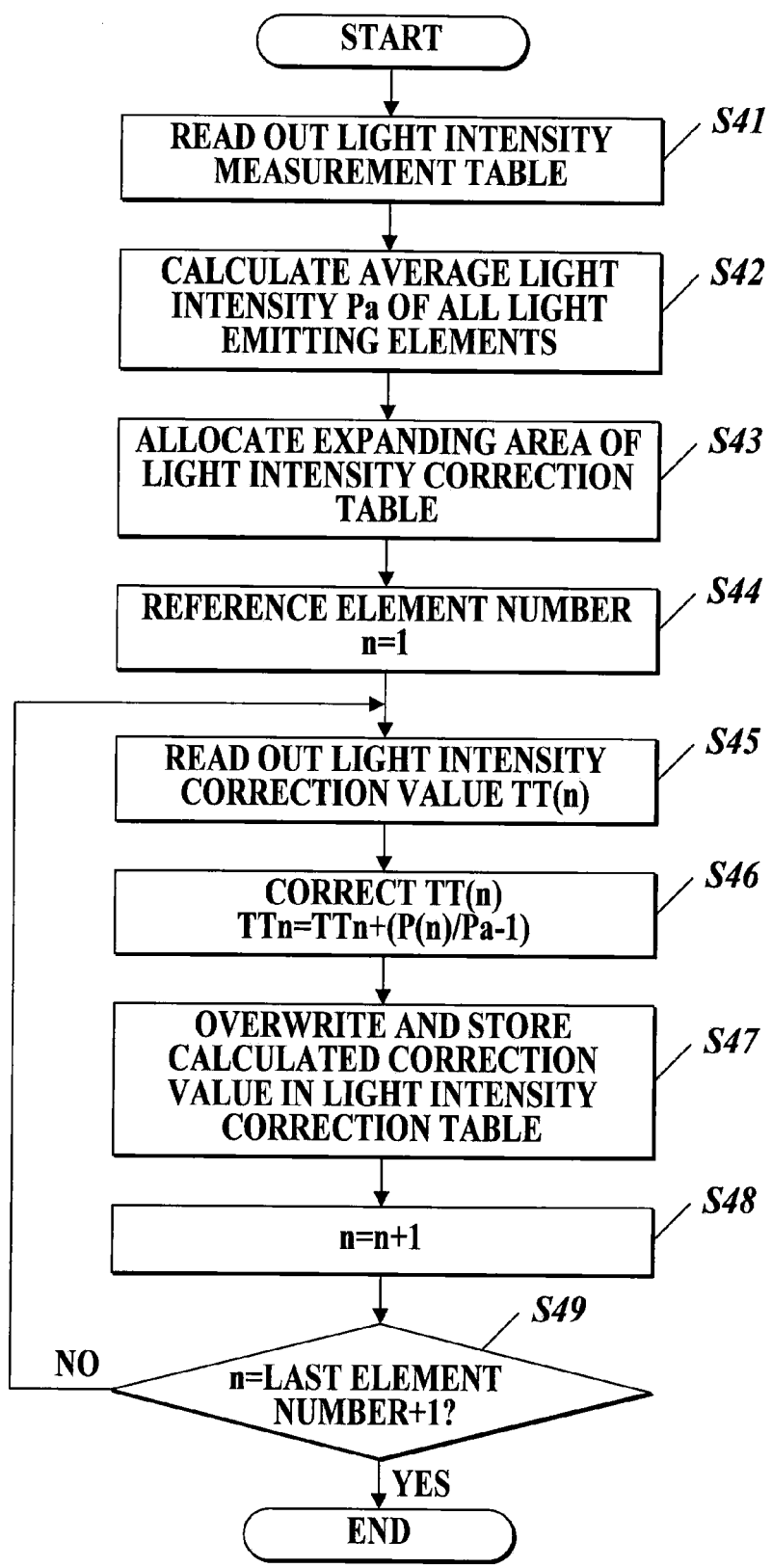

FIG.12

| BANK NAME | DIVIDED AREA | ADDRESS | DATA CONTENT |
|---|---|---|---|
| BANK A | A1 | 0000h ↓ 2FFFh | BASIC CORRECTION TABLE |
| | A2 | 3000h ↓ 7FFFh | BASIC CORRECTION TABLE AND ADJUSTMENT DATA |
| BANK B | B1 | 8000h ↓ AFFFh | BASIC CORRECTION TABLE AND ADJUSTMENT DATA |
| | B2 | B000h ↓ FFFFh | BASIC CORRECTION TABLE AND ADJUSTMENT DATA |

FIG.13

| | | PEAK VALUE, MP | | PEAK ELEMENT NUMBER, PP | | STARTING ELEMENT NUMBER, SP | | END ELEMENT NUMBER, EP | |
|---|---|---|---|---|---|---|---|---|---|
| | | UNDEFINED | PEAK VALUE | ELEMENT NUMBER Max15360d=3C00h | | ELEMENT NUMBER Max15360d=3C00h | | ELEMENT NUMBER Max15360d=3C00h | |
| | | HIGH ORDER 1 Byte | LOW ORDER 1 Byte | HIGH ORDER 1 Byte | LOW ORDER 1 Byte | HIGH ORDER 1 Byte | LOW ORDER 1 Byte | HIGH ORDER 1 Byte | LOW ORDER 1 Byte |
| PP1 | ADDRESS 8000h | 0h | 1h | 2h | 3h | 4h | 5h | 6h | 7h |
| | DATA | UNDEFINED 00h | 2(d) 02h | 11835(d) 2Eh 3Bh | | 11809(d) 2Eh 21h | | 11857(d) 2Eh 51h | |
| PP2 | ADDRESS 8008h | 8h | 9h | Ah | Bh | Ch | Dh | Eh | Fh |
| | DATA | UNDEFINED 00h | *(d) *h | *(d) *h | | *(d) *h | | *(d) *h | |
| PP3 | ADDRESS 8010h | 0h | 1h | 2h | 3h | 4h | 5h | 6h | 7h |
| | DATA | UNDEFINED 00h | *(d) *h | *(d) *h | | *(d) *h | | *(d) *h | |
| PP4 | ADDRESS 8018h | 8h | 9h | Ah | Bh | Ch | Dh | Eh | Fh |
| | DATA | UNDEFINED 00h | *(d) *h | *(d) *h | | *(d) *h | | *(d) *h | |
| PP5 | ADDRESS 8020h | 0h | 1h | 2h | 3h | 4h | 5h | 6h | 7h |
| | DATA | UNDEFINED 00h | *(d) *h | *(d) *h | | *(d) *h | | *(d) *h | |
| PP6 | ADDRESS 8028h | 8h | 9h | Ah | Bh | Ch | Dh | Eh | Fh |
| | DATA | UNDEFINED 00h | *(d) *h | *(d) *h | | *(d) *h | | *(d) *h | |
| SPARE | 8030h→ AFFFh | | | | | | | | |

IMAGE FORMING APPARATUS AND LIGHT INTENSITY CORRECTION METHOD

BACKGROUND

1. Field of the Invention

The present invention relates to an image forming apparatus and light intensity correction method.

2. Description of Related Art

Lately, an image forming apparatus which uses an LED printer head (hereinafter referred to as LPH) has been developed as an optical writing apparatus to form an electrostatic latent image on a surface of a photoreceptor drum. The LPH includes an LED chip array and lens array. In the LED chip array, LED chips including a plurality of Light Emitting Diode (LED) elements aligned according to a predetermined resolution along a main scanning direction are arranged in an array. A plurality of Graded Index (GRIN) lenses which form the electrostatic latent image on the photoreceptor drum by gathering exposed light emitted from the LED elements according to the image data are arranged in the lens array.

It is well known that light intensity unevenness occurs in an image forming apparatus which uses the LPH and the light intensity unevenness occurs due to variation in manufacturing of the LED element, variation in optical characteristic due to angle movement when fixing the GRIN lens and refractive index distribution, attached dust, etc. There is a problem that the light intensity unevenness causes density unevenness which further causes a black streak or white streak on the image.

Japanese Patent Application Laid-Open Publication No. 2005-59356 discloses an image forming apparatus provided with an LPH including a light emitting device including a first correction value storage section to store an element correction value corresponding to each LED in order to prevent an image flaw by black streak in the sub-scanning direction or density unevenness due to unevenness of light intensity of the LED or characteristic variation of the lens, and a second correction value storage section to store chip correction value corresponding to an LED chip, where correction data is generated by the element correction value read out from the first correction value storage section and the chip correction value read out from the second correction value storage section and the light intensity of light emission of the LED is corrected.

Also, Japanese Patent Application Laid-Open Publication No. 2005-28726 discloses an image forming apparatus using an LPH where an image is formed while moving the LPH in the main scanning direction and the formed image is output on a sheet in order to identify an image flaw in which a black streak or density unevenness occurs due to light intensity unevenness of the LED and to perform correction. Then, an image including a predetermined angle with respect to the paper conveying direction is read from the image output on the sheet and the density unevenness due to the LPH is detected. The correction value of the LPH is obtained based on the detected density unevenness and the exposed light intensity of the LPH is adjusted based on the obtained correction value.

However, it is known that the light intensity correction value of the LPH to reduce black streaks due to the lens array used in the LPH is different according to the type of image formed (for example, screen image which expresses grayscale representation), number of screen ruling, image density, etc. Therefore, there is a demand for a user to be able to adjust the correction value at a setting of an image density (especially grayscale) desired by the user of the image forming apparatus.

SUMMARY

The present invention has been made in consideration of the above problems, and it is one of main objects to enable sectional intensity adjustment of light emitting elements composing the LPH to enhance image quality.

In order to achieve at least one of the above-described objects, according to an aspect of the present invention, there is provided an image forming apparatus including:

an optical writing device including:
a light source section composed of a plurality of light emitting elements arranged in a main scanning direction;
an optical section including a plurality of coupled lenses to form an image on a light exposure face by gathering light emitted from the light emitting elements; and
a storage section to store first correction data for correcting the light intensity of the plurality of light emitting elements and second correction data for correcting an optical characteristic specific to the coupled lens, and
a control section to read out the first correction data and the second correction data from the storage section of the optical writing device and to correct the first correction data based on the second correction data.

According to another aspect of the present invention, there is provided a light intensity correction method for an image forming apparatus including an optical writing device including: a light source section composed of a plurality of light emitting elements arranged in a main scanning direction; an optical section including a plurality of coupled lenses to form an image on a light exposure face by gathering light emitted from the light emitting elements; and a storage section to store first correction data for correcting the light intensity of the plurality of light emitting elements and second correction data for correcting an optical characteristic specific to the coupled lens, the method including:

reading out the first correction data and the second correction data from the storage section of the optical writing device; and correcting the first correction data based on the second correction data.

BRIEF DESCRIPTION OF THE DRAWINGS

The present invention will become more fully understood from the detailed description given hereinbelow and the appended drawings, and thus are not intended to define the limits of the present invention, and wherein;

FIG. 7 is a flowchart showing a first light intensity adjustment processing;

FIG. 8 is a flowchart showing a second light intensity adjustment processing;

FIG. 12 is a diagram showing an example of a memory configuration of a storage section of the LPH;

FIG. 13 is a diagram showing an example of data format of correction target data stored in a partitioned area B1 of a B bank;

DETAILED DESCRIPTION OF PREFERRED EMBODIMENTS

A preferred embodiment reflecting an aspect of the present invention is described in detail with reference to the drawings. However, the scope of the invention is not limited to the illustrated examples.

In the present embodiment, LPH inspection is performed with an LPH inspection apparatus and after the inspection is performed on the LPH, the LPH is mounted on the image forming apparatus to perform light intensity adjustment of the LPH.

First, the configuration is described.

Figure 1:
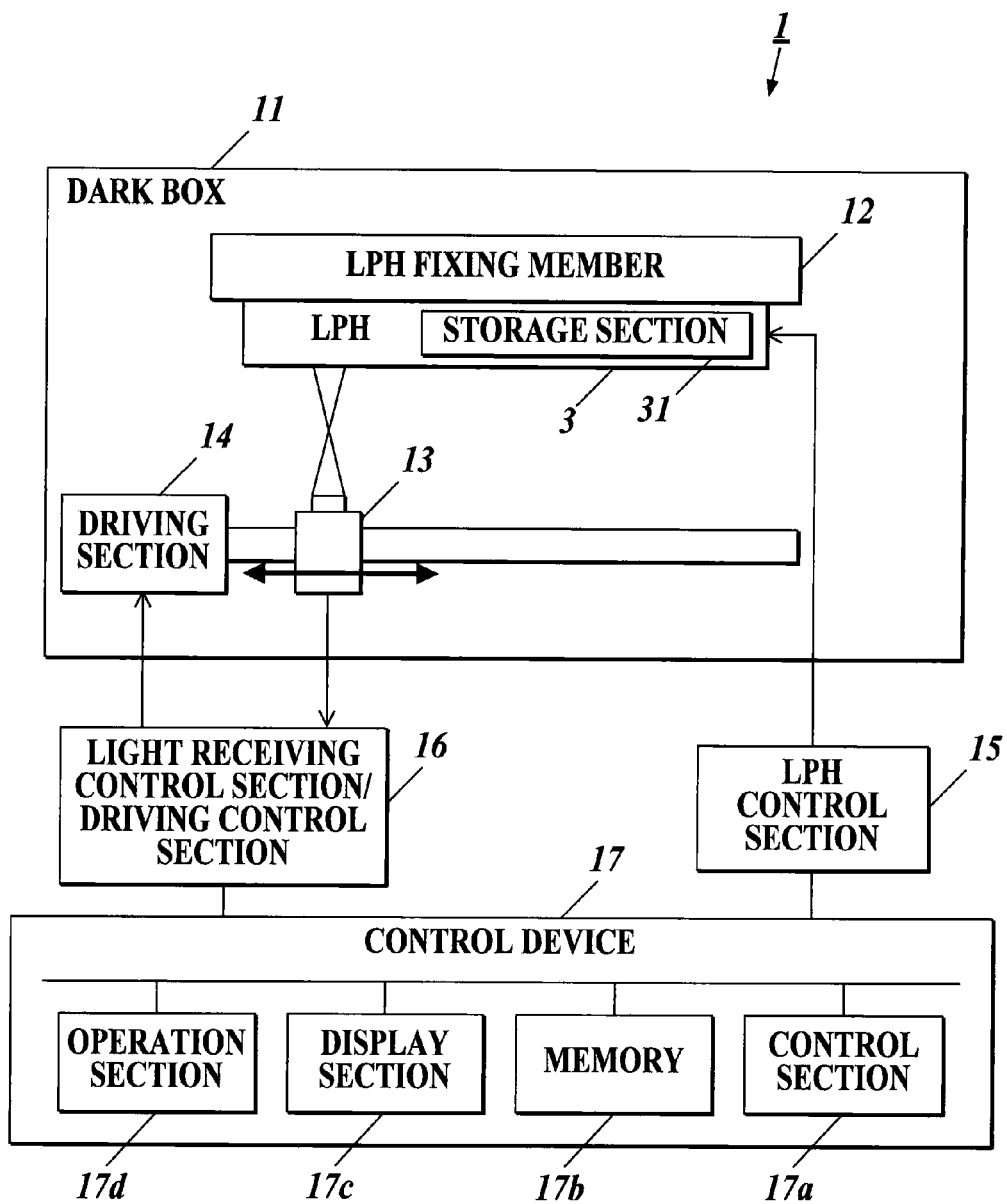
FIG. 1 is a diagram showing a configuration of an LPH inspection apparatus.

FIG. 1 shows a diagram of a configuration of the LPH inspection apparatus 1 of the present embodiment.

As shown in FIG. 1, the LPH inspection apparatus 1 includes an LPH 3, LPH fixing member 12, light receiving section 13 and driving section 14, which are provided in a dark box 11, LPH control section 15, light receiving control section/driving control section 16 and control device 17.

The LPH 3 includes a light source section and optics section. The light source section includes an LED array. The LED array includes a plurality of light emitting elements (for example, Light Emitting Diode (LED) element) arranged in a main scanning direction at a pixel pitch corresponding to a previously set resolution. The optics section includes a lens array. The lens array includes a plurality of image forming lenses (for example, Graded Index (GRIN) lens) which gather the light emitted from the light emitting elements and form an image on a light exposure face. The LPH 3 is an optical writing device in which light emitting elements are selectively driven and lit based on the image data and the light emitted from the driven light emitting element is gathered by the image forming lens to form an image on the light exposure face.

Incidentally, a unique identification number (element number) is applied to each light emitting element.

Further, the LPH 3 includes a storage section 31. The storage section 31 is an electrically rewritable nonvolatile storage medium such as Electrically Erasable and Programmable Read Only Memory (EEPROM), flash memory, etc. It is preferable that the storage section 31 can erase and write in a unit of a predetermined storage area.

Various pieces of data of the LPH obtained by the LPH inspection apparatus 1 are stored in the storage section 31. A basic correction table and correction target data are included in such various pieces of data.

The basic correction table is a piece of first correction data where a light intensity correction value for correcting the light intensity of each light emitting element is associated with the element number of each light emitting element in a form of a table.

The correction target data is a piece of second correction data to correct optical characteristics of a predetermined coupled lens. The correction target data includes block information. The block information shows the block (correction target block) where the light emitting elements in which the light intensity change according to the optical characteristics of the coupled lens are aligned and identifies the light intensity correction value of the light emitting element to be corrected from the light intensity correction value included in the basic correction table. Also, the correction target data includes correction information of light intensity correction value of the light emitting element included in the correction target block.

The LPH fixing member 12 holds the LPH 3 by, for example, air suction to fix the LPH 3 at a previously set position.

The light receiving section 13 receives light emitted from the LPH 3 and outputs the received light intensity value to the light receiving control section/driving control section 16. For example, a Charge Coupled Device (CCD), Photomultiplier Tube, Photodiode Tube or the like can be used as the light emitting section 13.

The driving section 14 includes a guide rail, etc. extending in a main scanning direction in a position facing the motor and light exposure face of the LPH 3. The driving section 14 holds the light receiving section 13 in the position facing the light exposure face of the LPH 3 on the guide rail and moves the light receiving section 13 in the main scanning direction according to an instruction from the light receiving control section/driving control section 16.

The LPH control section 15 controls the entire LPH 3 according to an instruction input from the control device 17. According to the instruction input from the control device 17, the LPH control section 15 sets in the LPH 3 light exposure time (lighting time) of the light emitting element, light intensity correction value, light emitting element to be lit and controls the lighting of the selected light emitting element according to the light exposure time. Also, according to the instruction input from the control device 17, the LPH control section 15 writes various pieces of data such as the basic correction table, correction target data, etc. in the storage section 31 of the LPH 3.

The light receiving control section/driving control section 16 performs photoelectric conversion processing and A/D conversion processing on the light intensity value input from the light receiving section 13 and calculates the light intensity measurement value. The light intensity measurement value is output to the control device 17. Also, the light receiving control section/driving control section 16 drives the motor of the driving section to move the light receiving section 13 held on the guide rail in the main scanning direction of the LPH 3 according to the instruction input from the control device 17.

The control device 17 includes a control section 17a, memory 17b, display section 17c, operation section 17d, etc. and centrally controls the entire LPH inspection apparatus 1.

The control section 17a includes a Central Processing Unit (CPU), Read Only Memory (ROM), Random Access Memory (RAM), and the like. The control section 17a reads out a system program, processing programs, pieces of data etc. stored in the ROM or the memory 17b and expands the program to the RAM. According to the expanded program, the control section 17a controls operation of the various sections of the control device 17 and also centrally controls the LPH control section 15 and light receiving control section/driving control section 16 and centrally controls the entire LPH inspection apparatus 1.

Also, the control section 17a reads out the LPH inspection program, light intensity correction table, various pieces of data, etc. stored in the ROM or the memory 17b and performs the LPH inspection processing. The LPH inspection processing includes the LPH section assembly inspection processing and correction data writing processing. Further, the LPH section assembly inspection processing includes the first to third light intensity adjustment processing, the MTF measurement processing and the first to third calculation processing.

In the first to third light intensity adjustment processing, the light intensity of the LPH is measured and the basic correction table is generated.

In the MTF measurement processing, the LPH control section 15 lights each light emitting element of the LPH according to a previously set lighting pattern based on the light intensity set according to the basic correction table generated in the first to third light intensity adjustment processing. Also, the light receiving control section/driving control section 16 drives the driving section 14 and the light receiving section 13 is moved to a position facing the lit light emitting element. Then, the light receiving section 13 receives light, and the characteristic data for each light emitting element is calculated based on the light intensity measurement value input from the light receiving control section/driving control section 16. The calculated characteristic data is specifically data of Modulation Transfer Function characteristic (MTF characteristic), which is also called contrast transfer function, and data representing resolving power of the optics system is calculated.

The lighting pattern used in the MTF measurement processing of the present embodiment is a lighting pattern which lights every other light emitting element (hereinafter also called 1 (ON)-1 (OFF)). There are other lighting patterns where one light emitting element is lit and three are off (hereinafter also called 1 (ON)-3 (OFF)) or two light emitting elements are lit and two are off (hereinafter also called 2 (ON)-2 (OFF)).

In the first calculation processing, a first movement average value for each light emitting element in a previously set first movement average block is calculated as a first calculation value based on characteristic data with respect to each light emitting element.

In the second calculation processing, a second movement average value for each light emitting element in a previously set second movement average block which is larger than the first movement average block is calculated as the second calculation value different from the first calculation value (first movement average value) based on characteristic data with respect to each light emitting element.

The first movement average block of the first calculation processing and the second movement average block of the second calculation processing is determined based on the position configuration of the image forming lens of the optical section of the LPH 3.

Figure 2:
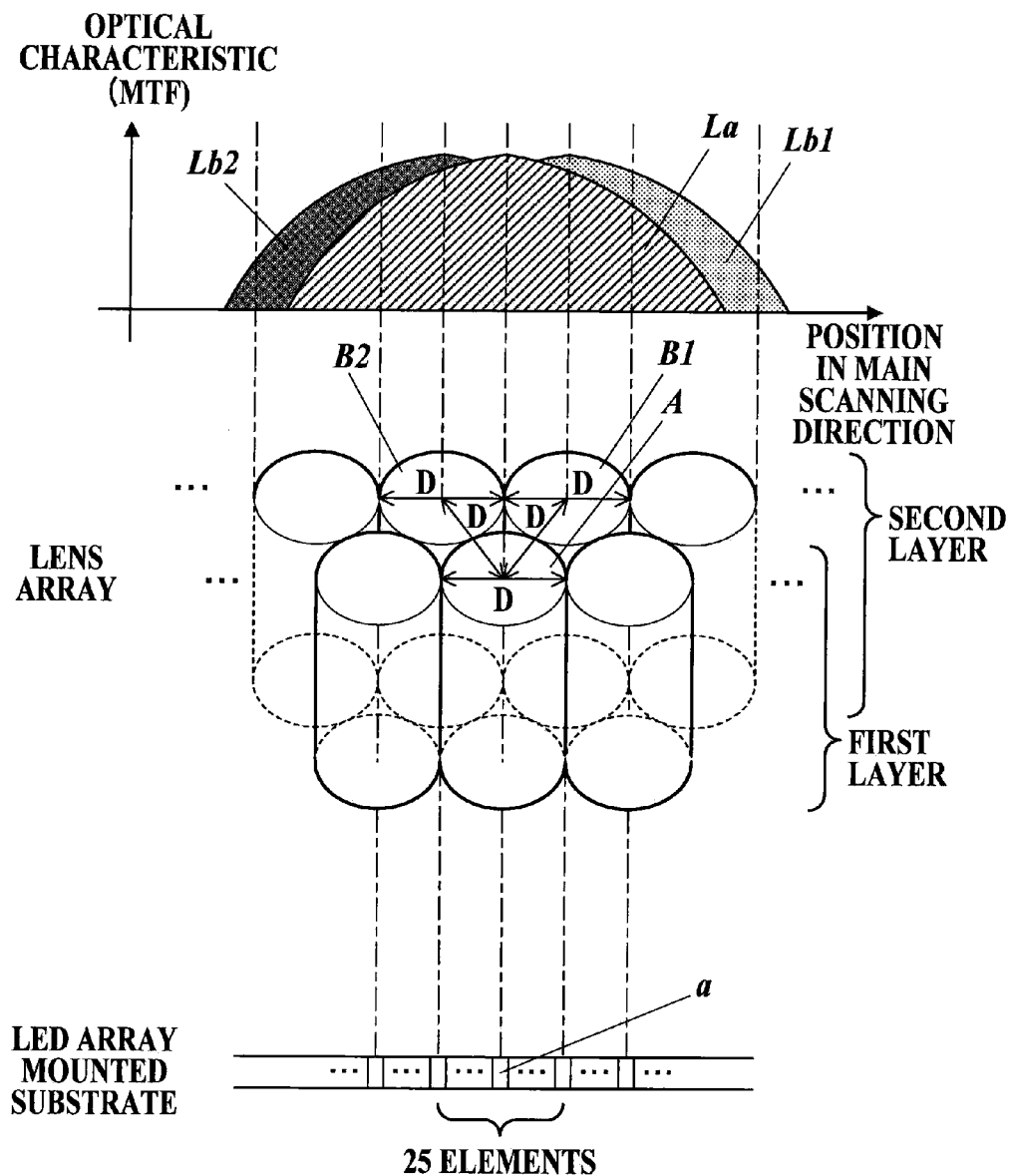
FIG. 2 is a diagram showing a relation between an example of arrangement of an imaging lens stacked like a stack of logs and a light emitting element.

The position configuration of the image forming lens of the present invention is an arrangement of a plurality of image forming lenses in a position called "stack like a stack of logs" in two lines in the main scanning direction. FIG. 2 shows a relation between an example of a position of the image forming lens in the "stack like a stack of logs" and the light emitting element. As shown in FIG. 2, to "stack like a stack of logs" means to align cylindrical image forming lenses adjacently in a radius direction as a first layer, and to place each image forming lens of a second layer similarly aligned as the first layer on a hollow formed between two adjacent image forming lenses of the first layer. In such position of the "stack like a stack of logs", a distance from an axis of one image forming lens to an axis of an adjacent image forming lens is a length of a sum of the radius of the two image forming lenses, which is, in other words, a length of a diameter D.

In such position of "stack like a stack of logs", it is known that when the image forming lens A with the highest optical contribution from the light emitted from the light emitting element a is tilted, the image forming lenses B1, B2 (in other words, two image forming lenses B1 and B2 which are image forming lenses of a layer different from the layer to which the image forming lens A belongs and are adjacent to the image forming lens A) with the second highest optical contribution are also influenced and the plurality of lens elements influence each other and generate black streaks.

When the resolution of the LPH is 1200 [dpi], the number of light emitting elements arranged in the diameter D of the image forming lens is about 25 elements. The optical characteristic when the light emitting element a shown in FIG. 2 is lit is due to the optical characteristic La of the image forming lens A and the optical characteristics Lb1, Lb2 of the image forming lens B1, B2. The number of elements of the light emitting elements where emitted light is received and gathered by the image forming lenses A, B1, B2 is the number of light emitting elements arranged in the diameter D of the two adjacent image forming lenses (about 50 elements). Therefore, since about 50 elements is the smallest number of elements which influence the detection accuracy where black streaks occur, it is preferable that this number of elements is the first movement average block.

The second movement average block needs to be the number of elements necessary to smoothly shape a MTF curve which is a graph of the MTF value of each light emitting element. For example, when the first movement average block is 52 elements, it is preferable that the second movement average block is 768 elements.

In the third calculation processing, based on the first movement average value as the first calculation value and the second movement average value as the second calculation value with respect to each light emitting element, the difference (average difference of movement) of subtracting the first movement average value from the second movement average value is calculated as the third calculation value.

After the third calculation processing, the correction target data is generated based on the third calculation value calculated in the third calculation processing and a previously set threshold.

Incidentally, it is preferable that the threshold is from 1.6 to 2.0 inclusive.

The correction target data includes correction target block peak value MP, peak element number PP, and as block information, starting element number SP and end element number EP.

The correction target block is the block of the light emitting element where the third calculation value is 1 or more in a block of the light emitting element where the third calculation value is a previously set threshold or more.

The peak value MP is the largest value of the third calculation value in the correction target block. The peak element number PP is the element number (maximum element number) of the light emitting element corresponding to the peak value MP.

The starting element SP is the element number (one edge element number) of the light emitting element of one edge of the correction target block, and for example is the element number of the light emitting element to be lit first in the correction target block in the main scanning direction. The end element number EP is the element number (other edge element number) of the light emitting element of the other edge of the correction target block, and for example is the element number of the light emitting element to be lit last in the correction target block in the main scanning direction.

The memory $17b$ is composed of a nonvolatile memory such as a flash memory, and rewritably stores various programs and pieces of data. Also, the memory $17b$ stores various necessary data such as an LPH inspection processing program, light intensity correction table storing an initial light intensity correction value previously set with respect to each light emitting element provided in the LPH 3, line period used in the first to third light intensity adjustment processing, exposure time, various lighting patterns used in the MTF measurement processing, threshold and the like. Further, the memory $17b$ also stores a table of the light intensity measurement value obtained from light received by the light receiving section 13 (light intensity measurement table), various calculation values, etc.

The display section $17c$ includes a display screen using Liquid Crystal Display (LCD), organic Electronic Luminescent (EL) element or the like. According to a display signal input from the control section $17a$, the display section $17c$ displays various display screens to input various setting conditions, various display screens to display various processing results, and the like.

The operation section $17d$ includes various operation key groups, touch panel which covers the display screen of the display section $17c$, etc. The operation section $17d$ outputs an operation signal input from the operation key group or touch panel to the control section $17a$.

Figure 3:
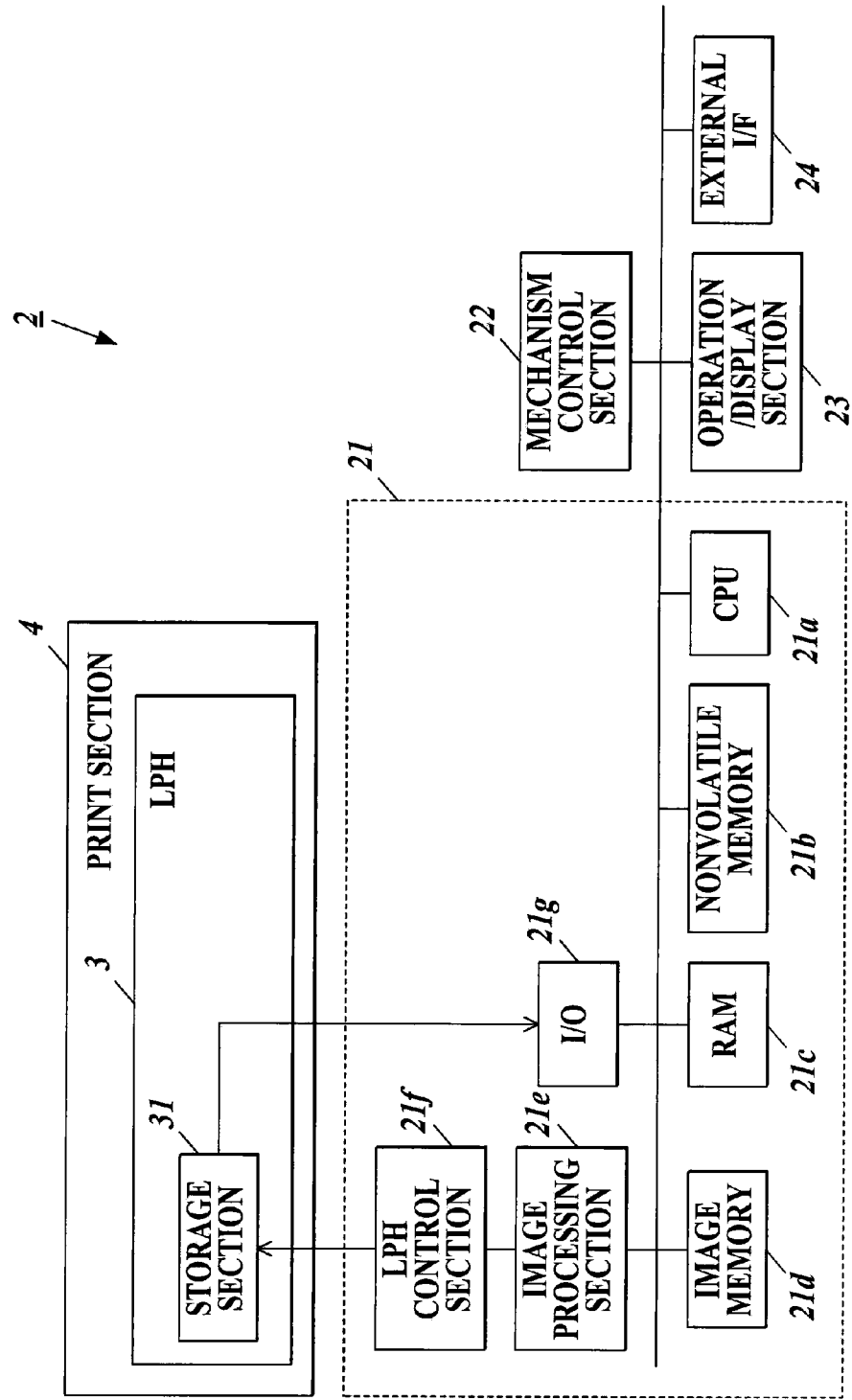
FIG. 3 is a control block diagram of an image forming apparatus.

FIG. 3 shows a control block diagram of the image forming apparatus 2 of the present embodiment.

The image forming apparatus 2 is a digital multifunction peripheral including a copier function which reads an image from a document and forms an image of the read image on a sheet of paper, etc., printer function which receives image data from an external device such as a Personal Computer (PC), forms an image indicated by the image data on a sheet and outputs the sheet, and functions of the like.

As shown in FIG. 3, the image forming apparatus 2 includes a main body control section 21, mechanism control section 22, operation/display section 23, external I/F 24, LPH 3, print section 4, image reading section (not shown) and the like, and each section is connected through a bus.

The main body control section 21 includes a CPU $21a$, nonvolatile memory $21b$, RAM $21c$, image memory $21d$, image processing section $21e$, LPH control section $21f$ connected to the image processing section $21e$, Input/Output (I/O) $21g$, etc.

The CPU $21a$ reads out a system program, various processing programs and pieces of data stored in the nonvolatile memory $21b$, expands these to the nonvolatile memory $21b$ or RAM $21c$, and according to the developed program, centrally controls the operation of each section of the image forming apparatus 2. The CPU $21a$ performs timing control of the entire system, storage and accumulation control of image data by using the nonvolatile memory $21b$ or RAM $21c$, input and output control of the image data from and to the print section, and interface (I/F) and operation control with other applications (FAX, printer, scanner, etc.)

Also, the CPU $21a$ reads out an LPH adjustment processing program and other various pieces of data stored in the nonvolatile memory $21b$ and performs LPH adjustment processing.

In the LPH adjustment processing, the basic correction table (first correction data) and correction target data (second correction data) are read out from the storage section 31 of the LPH 3. Then, an adjustment menu screen is displayed on the operation/display section and the basic correction table is corrected based on the correction target data adjusted according to the adjustment instruction information input from the operation/display section. An image based on the image data for image quality confirmation which uses the corrected basic correction table is formed on paper and output by the print section 4.

The adjustment menu screen displays the read out correction target data and receives adjustment instruction information concerning the correction target data.

Programs, LPH adjustment processing and data corresponding to the image forming apparatus 2 are stored in advance in the nonvolatile memory $21b$ and a system program, various processing programs corresponding to the system and data necessary for processing the various processing programs are also stored.

Also, the nonvolatile memory $21b$ is composed of a nonvolatile memory such as a flash memory and stores in advance various programs corresponding to the image forming apparatus 2 and data necessary for processing the various programs. Also, the nonvolatile memory $21b$ stores the LPH adjustment processing program and various pieces of data necessary in the LPH adjustment processing program such as image data for image quality confirmation, etc.

The RAM $21c$ is a temporary storage area for the program read out from the nonvolatile memory $21b$, input, or output data and parameters in various processing performed by the CPU $21a$.

The image memory $21d$ includes an image data memory and light intensity correction data memory.

The image data memory uses a Dynamic RAM (DRAM), etc. The image data memory stores the image data sent from the image reading section, external I/F 24, etc.

The light intensity correction data memory uses a rewritable nonvolatile memory such as an Electronically Erasable and Programmable Read Only Memory (EEPROM). The light intensity correction data memory stores data (basic correction table, correction target data, etc.) read out from the LPH 3.

The image processing section $21e$ performs image processing (variation of magnification, filtering, gamma conversion, etc.) of image data stored in the image memory $21d$ and generates print data to be output by printing.

The LPH control section $21f$ stores print data generated in the image processing section $21e$ and outputs to the LPH 3 various signals based on the generated print data and data to be written in the storage section 31 of the LPH 3.

The I/O $21g$ outputs to the CPU $21a$ the basic correction table and the correction target data read out from the storage section 31 of the LPH 3 and stores the data in the light intensity correction data memory of the image memory $21d$.

The mechanism control section 22 centrally controls various driving mechanisms, various sensors and the like in the image forming apparatus 2 based on a signal from the main body control section 21, and for example, controls the driving of the motor which rotates the photoreceptor drum included in the image forming section at a certain speed.

The operation/display section 23 is composed of a display screen using a Liquid Crystal Display (LCD) or organic Electronic Luminescent (EL) element and operation key group including numeral keys and power source switch. A touch panel is provided on the display screen so as to cover the display screen and the display screen displays various setting screens to input various setting conditions, adjustment menu screen, operation status and processing result, etc. of the image forming apparatus 2 according to a display signal input from the main body control section 21. Also, the operation/display section 23 sends the operation signal input from the operation key group or touch panel to the main body control section 21.

The external I/F 24 is composed of various interfaces such as Network Interface Card (NIC), MODEM (Modulator-Demodulator), USB (Universal Serial Bus), and sends and receives information to and from communicably connected external devices.

The print section 4 includes an image forming section with an LPH 3, cleaning section, transfer belt, paper feeding section, conveying section, fixing section, etc. and forms an image on a sheet of paper.

Next, the operation of the present embodiment is described.

Figure 4:
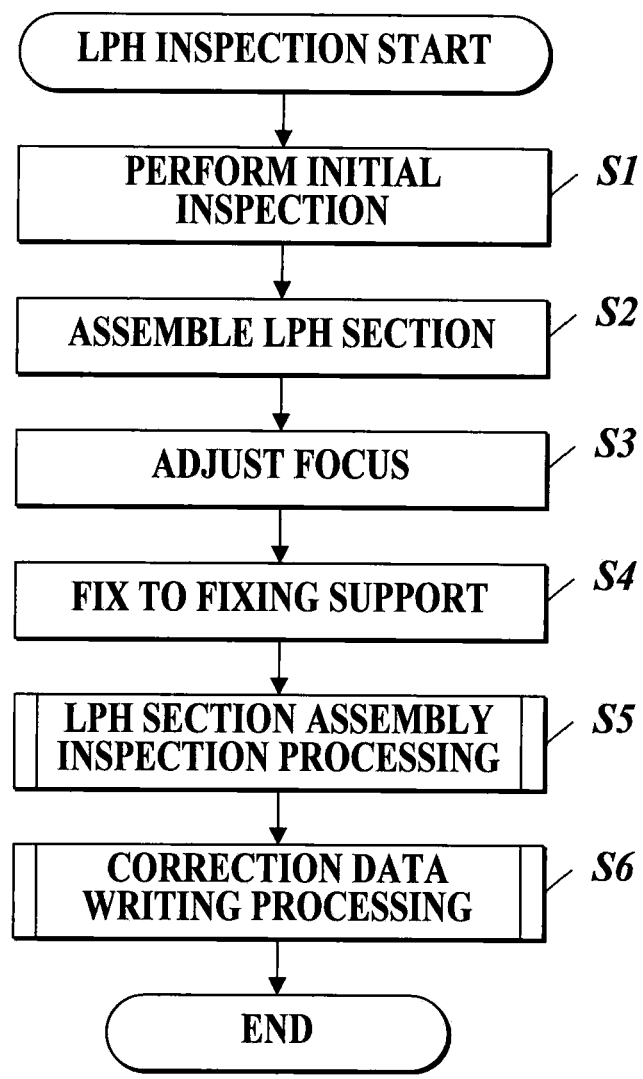
FIG. 4 is a flowchart showing an LPH inspection processing.

FIG. 4 is a flow chart showing the LPH inspection processing of the present embodiment.

The process shown in FIG. 4 is a processing performed using the LPH inspection apparatus 1.

First, an initial inspection of the LPH 3 is performed (step S1). In the initial inspection, the outer appearances of the various components included in the LPH 3 are observed, and it is checked whether there is no scratch or soil on the components, and the initial values of the light intensity, MTF value, focus position, etc. of the LPH 3 are set.

After the initial inspection, LPH section assembly where the various components and fixing members of the LPH 3 are assembled is performed (step S2). The assembled LPH 3 is temporarily placed on the LPH fixing member 12 and alignment with the light receiving section 13 and adjustment of the focus position are performed (step S3).

After the adjustment of the focus position, bonding and drying of the various components included in the LPH 3 are performed, and the LPH 3 is fixed to the fixing supporting section of the LPH fixing member 12, etc. (step S4).

The LPH section assembly inspection processing is performed on the LPH 3 fixed on the LPH fixing member 12 (step S5), correction data writing processing is performed (step S6) and processing in the LPH inspection apparatus 1 ends.

Figure 5:
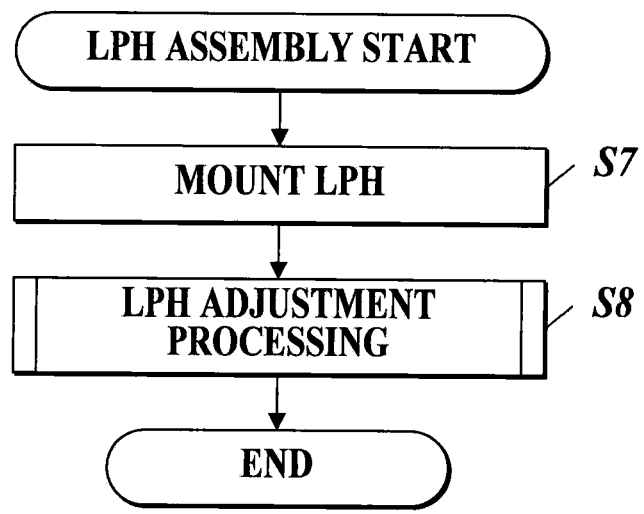
FIG. 5 is a flowchart showing an LPH assembly processing.

FIG. 5 shows a flowchart of the LPH assembly processing of the present embodiment.

The processing shown in FIG. 5 is processing performed using the image forming apparatus 2.

After the LPH inspection processing by the LPH inspection apparatus 1 is finished, the LPH 3 is mounted to a predetermined position of the image forming apparatus 2 (step S7). Then, in the image forming apparatus 2 with the LPH 3 mounted thereto, LPH adjustment processing using the LPH 3 is performed (step S8) and then the processing in the image forming apparatus 2 ends.

Figure 6:
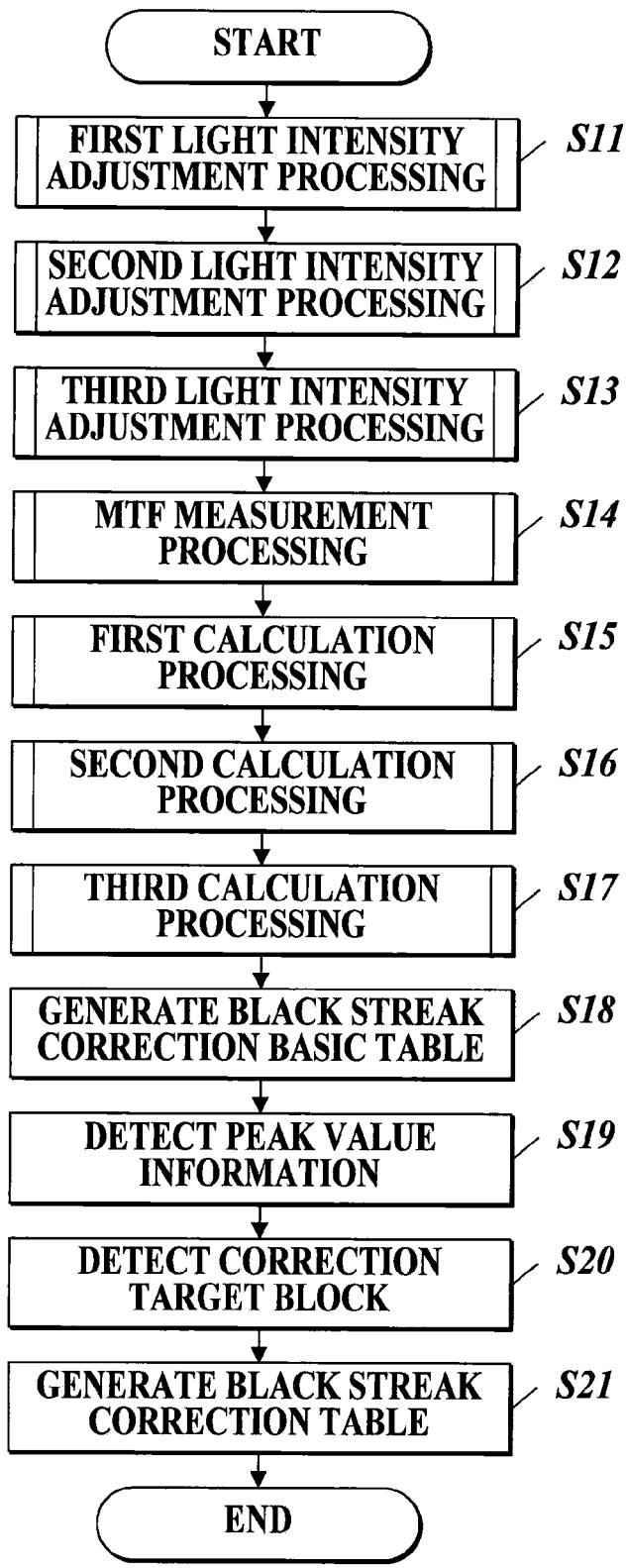
FIG. 6 is a flowchart showing LPH section assembly inspection processing performed by the LPH inspection apparatus.

FIG. 6 shows a flowchart of the LPH section assembly inspection processing performed in the LPH inspection apparatus 1.

The processing shown in FIG. 6 is performed by the control section 17*a* in coordination with each section.

The control section 17*a* performs the first light intensity adjustment processing (step S11) and after performing the first light intensity adjustment processing performs the second light intensity adjustment processing (step S12) and after the second light intensity adjustment processing performs the third light intensity adjustment processing (step S13).

After the control section 17*a* performs the third light intensity adjustment processing, the light intensity unevenness of the light emitting element provided in the LPH 3 is adjusted to a previously set value or less and the basic correction table where the light intensity correction value with respect to each light emitting element corresponds to the element number is generated.

Details of the first to third light intensity adjustment processing is described below.

The control section 17*a* performs MTF measurement processing on the LPH 3 in which the light intensity unevenness of the light emitting element is adjusted (step S14). As the MTF measurement processing, there are a regular processing which calculates the MTF value of each light emitting element with respect to each lighting pattern and simplified processing which calculates the common MTF value of a plurality of continuously arranged elements, and in order to increase calculation efficiency, it is preferable to use simplified processing, and in the present embodiment, simplified processing is used.

After the MTF measurement processing is performed, the control section 17*a* performs the first calculation processing (step S15). In the first calculation processing of the present embodiment, the first movement average block is 52 elements, and the first movement average value of each light emitting element is calculated with each light emitting element as the center of the first movement average block.

The first calculation processing when the MTF value is calculated by the simplified processing is described.

The MTF value calculated in the simplified processing of the present embodiment is the common MTF value with respect to every four light emitting elements. Therefore, when the first movement average block is 52 elements, the first movement average value is calculated in a unit of 13 groups where 4 elements compose one group. For example, the first movement average value of each group is calculated based on the MTF value of the light emitting element with the element number which is a multiple of four. Among the light emitting elements included in a group number m, the first movement average value MTF a1($n$) of a light emitting element with the smallest element number is calculated by the following formula (1).

$$MTFa1(n) = \{MTF(n-24)+MTF(n-20)+MTF(n-16)+ MTF(n-12)+MTF(n-8)+MTF(n-4)+MTF(n)+ MTF(n+4)+MTF(n+8)+MTF(n+12)+MTF(n+ 16)+MTF(n+20)+MTF(n+24)\}/13 \quad (1)$$

Incidentally, the first movement average value of the light emitting elements of groups below half of the first movement average block (first group to sixth group) is the first movement average value of the light emitting element of the seventh group and the first movement average value of the light emitting elements of the final group (M-th group) to the group at the block at the half of the first movement average block (M-th group to M-6th group) is the first movement average value of the light emitting element of M-7th group.

After the MTF measurement processing, the control section 17*a* performs the second calculation processing (step S16). In the second calculation processing of the present embodiment, the second movement average block is 768 elements, and the second movement average value of each light emitting element is calculated with each light emitting element as the center of the second movement average block.

The second calculation processing when the MTF value is calculated by the simplified processing is described.

As described above, the MTF value calculated in the simplified processing is the common MTF value with respect to every four light emitting elements. Therefore, when the second movement average block is 768 elements, the second movement average value is calculated in a unit of 192 groups where 4 elements compose one group. For example, the second movement average value of each group is calculated based on the MTF value of the light emitting element with the element number which is a multiple of four. Among the light emitting elements included in a group number m, the second movement average value MTF $a2(n)$ of a light emitting element with the smallest element number is calculated by the following formula (2).

$$\text{MTF}a2(n) = \{\text{MTF}(n-384) + \text{MTF}(n-380) + \ldots + \text{MTF}(n-4) + \text{MTF}(n) + \text{MTF}(n+4) + \ldots + \text{MTF}(n+376) + \text{MTF}(n+380)\}/192 \quad (2)$$

Incidentally, the second movement average value of the light emitting elements of groups below half of the second movement average block (first group to ninety-sixth group) is the second movement average value of the light emitting element of the ninety-seventh group (light emitting element with element number n=385 to 388) and the second movement average value of the light emitting elements of the final group (M-th group) to the group at the block at the half of the second movement average block (M-th group to M-96th group) is the second movement average value of the light emitting element of M-97th group.

After the first calculation processing and the second calculation processing, the control section 17a performs the third calculation processing where the difference value MTF d(n) where the first movement average value MTF $a1(n)$ of each light emitting element is subtracted from the second movement average value MTF $a2(n)$ of each light emitting element (step S17).

The control section 17a detects the largest value of the difference value MTF d(n) for each segment of a previously set number of light emitting elements (for example, when the light emitting elements are arranged with 15360 pixels in the main scanning direction, 384 pixels). Then, the control section 17a detects the segment where the detected maximum value is a previously set threshold or larger. The control section 17a refers to the difference value MTF d(n) of the light emitting element for each detected segment and detects the block of the light emitting element where the difference values MTF d(n) including the light emitting element with the largest value of the difference value MTF d(n) are continuously 0 or larger. The control section 17a processes the difference value MTF d of each light emitting element of the detected block to a value where the digits to the right of the decimal point are discarded. The control section 17a generates a black streak correction basic table where the processed difference value (fourth calculation value MTF t(n)) is associated with the element number (step S18).

The control section 17a detects peak value information based on the black streak correction basic table (step S19). In step S19, the control section 17a extracts the block in which the fourth calculation value MTF t(n) calculated in step S18 is 1 or more in continuous light emitting elements and detects the peak value information including the maximum value (peak value MP) of the difference value MTF d(n) with respect to each block and the element number (peak element number PP) corresponding to the peak value MP.

The control section 17a detects the correction target block based on the peak element number PP (step S20). In step S20, the control section 17a searches the element number which is around the peak element number PP and the element number in which the fourth calculation value MTF t(n) is 0, and detects the correction target block based on the searched element number.

For example, the fourth calculation value MTF t(n) is searched in the direction where the element number becomes smaller from the peak element number PP, in other words, the direction in the main scanning direction from the peak element number PP toward the element number of the light emitting element which is lit first, and the element number with 1 added to the element number where the fourth calculation value MTF t(n) is 0, is detected as the starting element number SP of the correction target block including the peak element number PP.

Also, the fourth calculation value MTF t(n) is searched in the direction where the element number becomes larger from the peak element number PP, in other words, the direction in the main scanning direction from the peak element number PP toward the element number of the light emitting element which is lit last, and the element number with 1 subtracted from the element number where the fourth calculation value MTF t(n) is 0, is detected as the end element number EP of the correction target block including the peak element number PP.

Therefore, the block from the starting element number SP to the end element number EP including the peak element number PP is to be the correction target block. In other words, the correction target block is a block including the peak element number PP, where the fourth calculation value MTF t(n) is 1 or more in continuous light emitting elements.

The control section 17a sets the peak value information (peak value MP, peak element number PP) detected in step S19 and step S20 and correction target block (starting element number SP, end element number EP) as correction target information.

Then, the control section 17a reads out the basic correction table generated in steps S11 to S13, generates a black streak correction table based on the basic correction table and the correction target data (step S21) and ends the processing.

In step S21, a basic correction table where the data of the correction target block is the data of the basic correction table and the data of the other block is 0 is generated and the generated basic correction table is subtracted from the read out basic correction table and the basic correction table obtained by the difference is generated as the black streak correction table.

FIG. 7 shows a flowchart of the first light intensity adjustment processing.

The control section 17a reads out the light intensity correction table storing the initial light intensity correction value set in the initial inspection from the memory 17b and allows the LPH control section 15 to set the initial light intensity correction value in each light emitting element which is to be the electric current adjustment value of each light emitting element (step S31). Also, the control section 17a reads out the line period and exposure time from the memory 17b and allows the LPH control section 15 to set the line period of the LPH 3 and exposure time of each light emitting element in the LPH 3 (step S32).

After specifying the element number to be lit (lighted element number) n to 0 (step S33), the control section 17a adds 1 to the lighted element number n (step S34), and allows the light receiving control section/driving control section 16 to drive the driving section 14 to move the light receiving section 13 to a position corresponding to the lighted element number n (step S35).

The control section 17a allows the LPH control section 15 to light the light emitting element with the lighted element number n (step S36). The control section 17a obtains the light intensity measurement value P(n) where the light intensity value of the light received by the light receiving section 13 is converted by the light receiving control section/driving control section 16 and stores the light intensity measurement value P(n) in the light intensity measurement table (step S37).

The control section 17a judges whether or not the lighted element number n is the last element number (step S38). In step S38, when the lighted element number n is not the last element number (step S38; NO), the first light intensity adjustment processing returns to step S34, and when the lighted element number n is the last element number (step S38; YES), the first light intensity adjustment processing ends.

FIG. 8 is a flowchart showing the second light intensity adjustment processing.

The control section 17a reads out the light intensity measurement table stored in the memory 17b (step S41), calculates the average light intensity Pa of all of the light emitting elements from the light intensity measurement value of each light emitting element (step S42) and allocates an expanding area of the light intensity correction table in the memory 17b (step S43).

The control section 17a sets the element number (reference element number) n of the referred light emitting element to 1 (step S44) and reads out the light intensity correction value TT(n) of the reference element number n stored in the light intensity correction table (step S45).

The control section 17a performs correction of the light intensity correction value TT(n) based on the read out light intensity correction value TT(n) of the reference element number n, light intensity measurement value P(n) of the reference element number n and average light intensity Pa, and calculates a new light intensity correction value TT(n) (step S46). Specifically, the read out light intensity correction value TT(n) is added to the value where 1 is subtracted from the value of the light intensity measurement value P(n) divided by the average light intensity Pa and the resulting value is to be the new light intensity correction value TT(n). The following formula (3) shows the formula to calculate the new light intensity correction value TT(n).

$$TT(n)=TT(n)+(P(n)/Pa-1) \quad (3)$$

The control section 17a writes over the light intensity correction value TT(n) calculated in step S46 in the light intensity correction table and stores the value (step S47) and adds 1 to the reference element number n (step S48).

The control section 17a judges whether or not the reference element number n is a value where 1 is added to the last element number (step S49). In step S49, when the reference element number n is not a value where 1 is added to the last element number (step S49; NO), the second light intensity adjustment processing returns to step S25, and when the reference element number n is a value where 1 is added to the last element number (step S49; YES), the second light intensity adjustment processing ends.

Figure 9A:
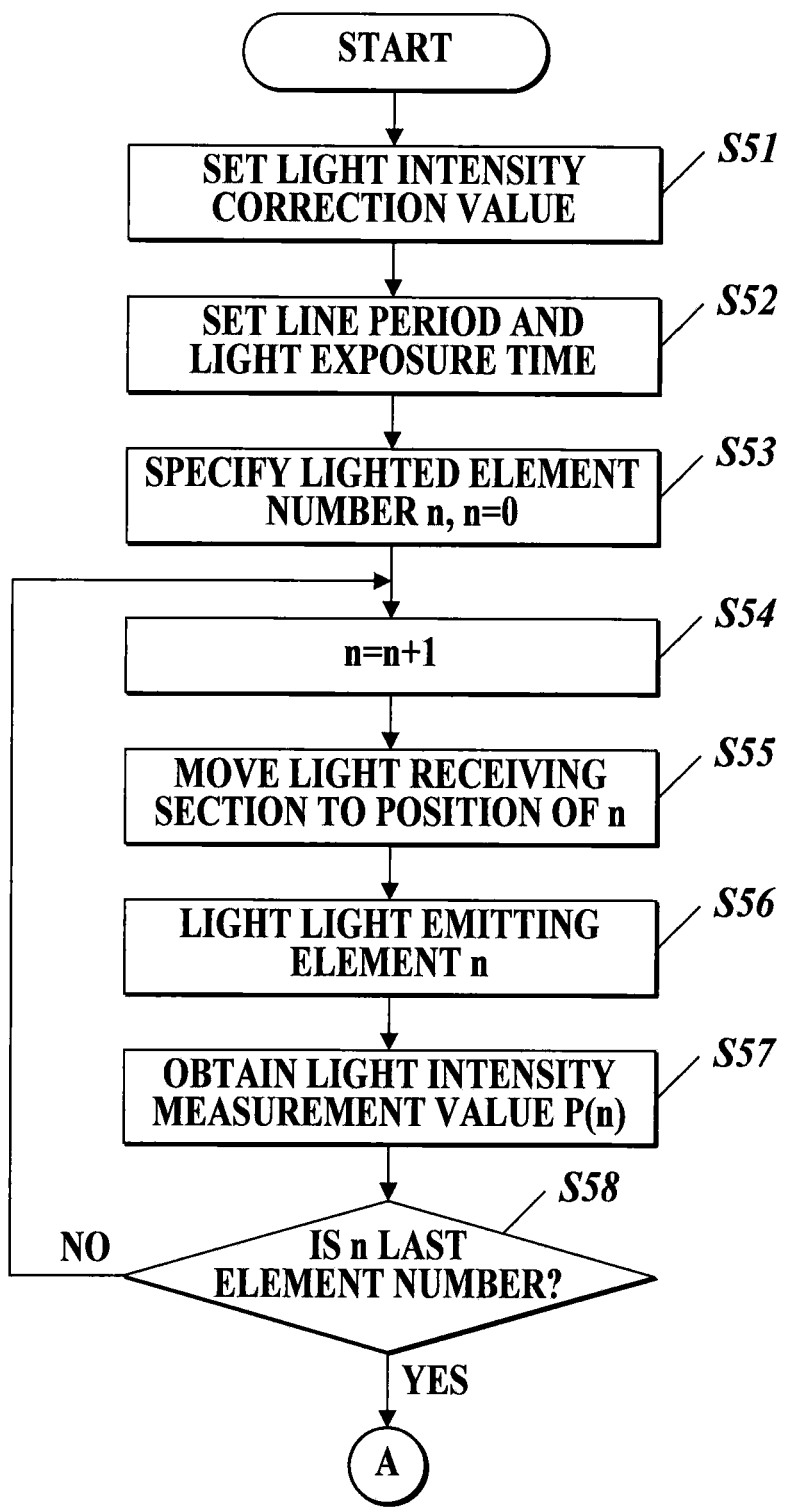
FIGS. 9A and 9B are a flowchart showing a third light intensity adjustment processing.
Figure 9B:
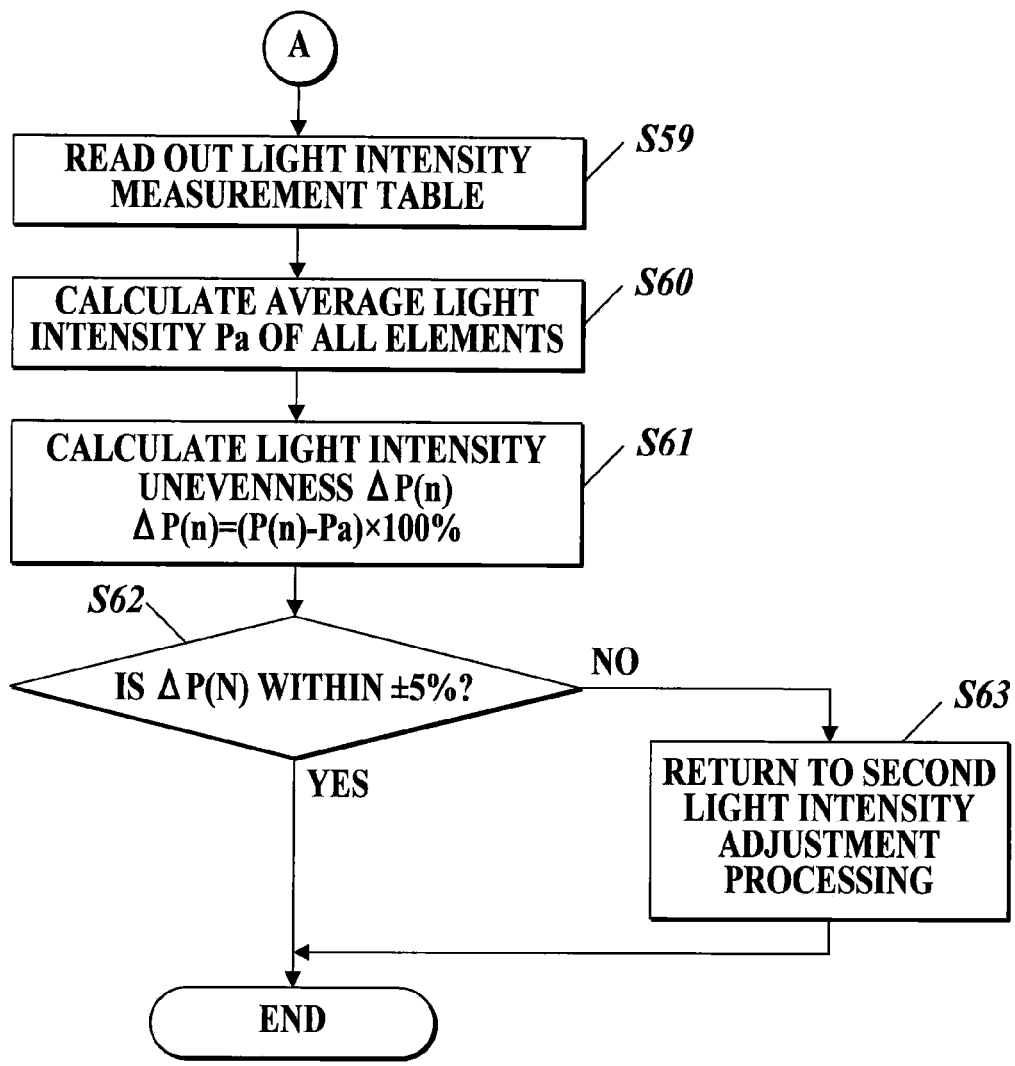

FIG. 9 is a flowchart showing the third light intensity adjustment processing.

The control section 17a reads out the light intensity correction table (in other words, the light intensity correction table in which the light intensity value calculated in the second light intensity adjustment processing is stored) stored in the memory 17b and allows the LPH control section 15 to set the light intensity correction value in each light emitting element which is to be the electric current adjustment value of each light emitting element (step S51). Incidentally, steps S52 to S58 are similar to the steps S32 to S38 of the first light intensity adjustment processing, and thus the description is omitted.

The control section 17a reads out the light intensity measurement table generated in the processing (step S59) and calculates the average light intensity Pa of all of the light emitting elements from the light intensity measurement value of each light emitting element (step S60).

The control section 17a calculates the light intensity unevenness ΔP(n) of each light emitting element based on the light intensity measurement value P(n) and average light intensity Pa of each light emitting element (step S61). Specifically, the light intensity measurement value P(n) is divided by the average light intensity Pa and 100 is multiplied to the resulting value and the value expressed as a percent [%] is determined as the light intensity unevenness ΔP(n). The formula (4) below shows the formula for calculating the light intensity unevenness ΔP(n) of the light emitting element of the element number n.

$$\Delta P(n)=(P(n)-Pa)\times 100[\%] \quad (4)$$

The control section 17a judges whether or not the light intensity unevenness ΔP(n) of all of the light emitting elements are within ±5[%] (step S62). In step S62, if the light intensity unevenness ΔP(n) of all of the light emitting elements are not within ±5[%] (step S62; NO), the processing returns to the second light intensity adjustment processing (step S63) and the third light intensity adjustment processing ends and when the light intensity unevenness ΔP(n) of all of the light emitting elements are within ±5[%] (step S62; YES), the third light intensity adjustment processing ends.

By performing the first to third light intensity adjustment processing, the light intensity correction table where the light intensity unevenness of all of the light emitting elements are within a predetermined range (±5[%]) is generated. This light intensity correction table is to be the basic correction table. Also, performing the first to third light intensity adjustment processing enhances the accuracy of calculating the MTF value of each light emitting element calculated by the MTF measurement processing performed later, and increases reliability of the accuracy of identifying the correction target light emitting element.

Next, the MTF measurement processing is described.

There are three lighting patterns used in the MTF measurement processing which are 1 (ON)-1 (OFF), 1 (ON)-3 (OFF), 2 (ON)-2 (OFF). The type of MTF measurement processing is a combination of any of the lighting patterns and the regular processing or simplified processing of the MTF calculation processing. In the present embodiment, The MTF measurement processing is a simplified processing with a 1 (ON)-3 (OFF) lighting pattern.

The MTF measurement processing of simplified processing with the 1 (ON)-3 (OFF) lighting pattern is described below.

The MTF measurement processing of simplified processing with the 1 (ON)-3 (OFF) lighting pattern is a processing where four continuously placed light emitting elements compose one group and the MTF value of any one of the light emitting elements of each group is calculated and the MTF value is to be the common MTF value of the group.

In the MTF measurement processing of simplified processing with the 1 (ON)-3 (OFF) lighting pattern of the present embodiment, the light emitting elements are successively lit from the first light emitting element with three elements in between off (for example, light emitting elements of element number n=1, 5, 9 and so on are lit) and the maximum light intensity value of the lit light emitting element is obtained, and also the light receiving section 30 is moved to the position of the light emitting element in the middle position among the three continuous light emitting elements between the lit elements (for example, light emitting elements of element number n=3, 7, 11 and so on) and the minimum light intensity value of the lit light emitting element is obtained. Then, in the MTF measurement processing of simplified processing with the 1 (ON)-3 (OFF) lighting pattern, the MTF value is calculated based on the maximum light intensity value and the minimum light intensity value and the MTF value is to be the common MTF value of each group.

Figure 10A:
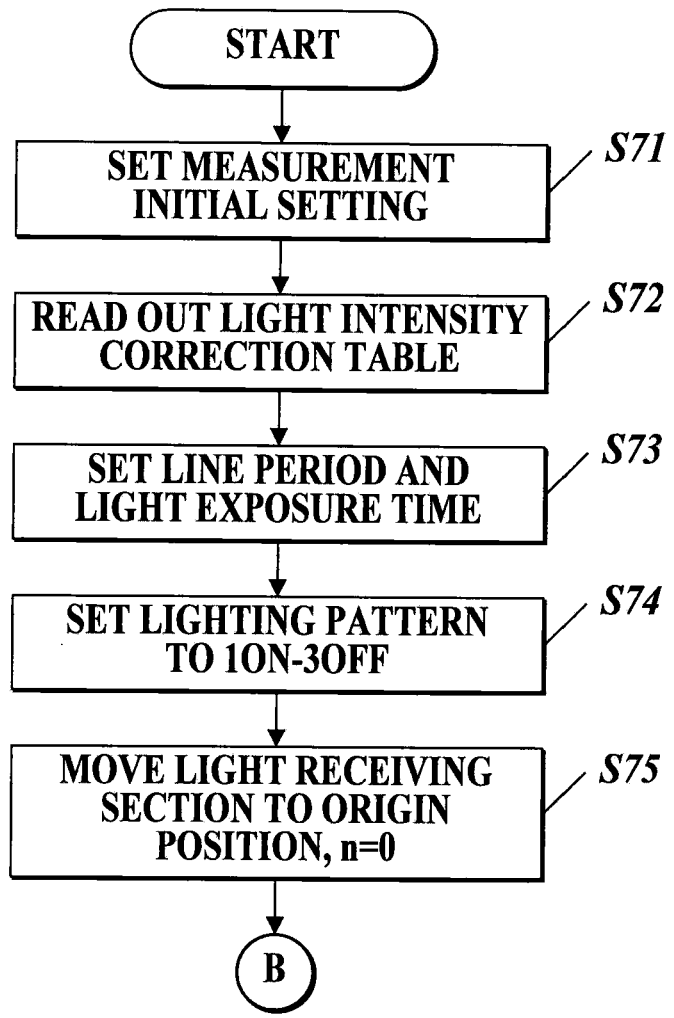
FIGS. 10A and 10B are a flowchart showing MTF measurement processing with a simplified processing of a 1 (ON)-3 (OFF) lighting pattern.
Figure 10B:
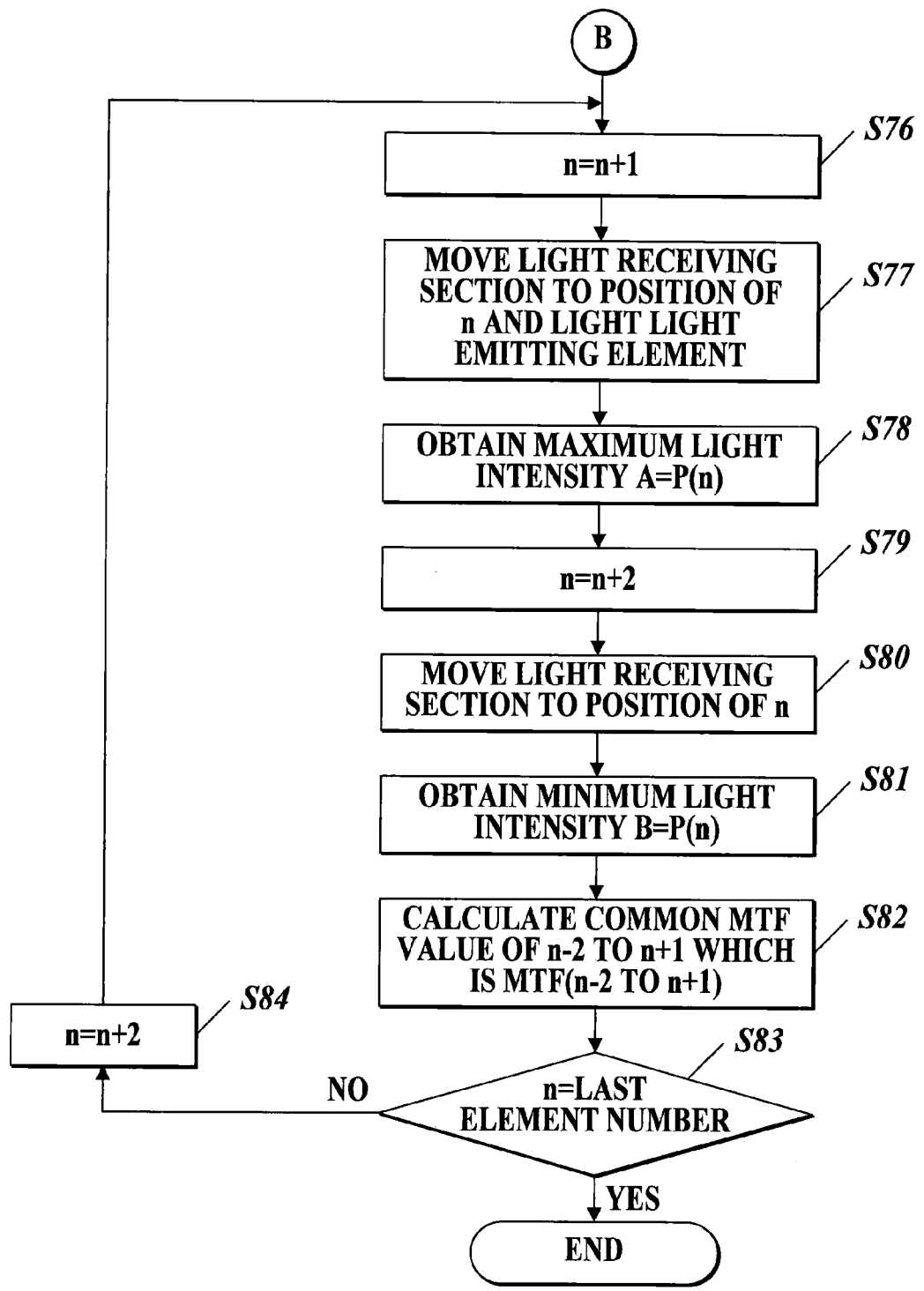

FIG. 10 is a flowchart showing the MTF measurement processing of the simplified processing with 1 (ON)-3 (OFF) lighting pattern.

The control section 17a performs initial setting of each section before measurement (step S71). For example, the light receiving section 13 is moved to the origin position on the guide rail by the light receiving control section/driving control section 16, and the reference adjustment of the light receiving section 13 and the initial setting of the A/D conversion circuit and the storage memory in the light receiving control section/driving control section 16 are performed.

After step S71, the control section 17a reads out the light intensity correction table (basic correction table) from the memory 17b and allows the LPH control section 15 to set the basic correction value in each light emitting element which is the electric current adjustment value of each light emitting element (step S72). The light intensity correction table read out in step S72 stores the light intensity correction value calculated in the second light intensity adjustment processing.

Also, the control section 17a reads out the line period and the exposure time from the memory 17b and allows the LPH control section 15 to set the line period of the LPH 3 and the exposure time of each light emitting element in the LPH 3 (step S73).

The control section 17a allows the LPH control section 15 to set the lighting pattern to 1 (ON)-3 (OFF) pattern where the light emitting element positioned at one edge of each group is successively lit (step S74). The control section 17a allows the light receiving control section/driving control section 16 to move the light receiving section 13 to the origin position and the control section 17a also sets the reference element number n to 0 (step S75).

The control section 17a adds 1 to the reference element number n (step S76). Then, the control section 17a allows the light receiving control section/driving control section 16 to drive the driving section 14 to move the light receiving section 13 to the position corresponding to the reference element number n and allows the LPH control section 15 to light the light emitting element of the reference element number n (step S77). The control section 17a obtains the light intensity measurement value P(n), which is the light intensity value of the light received by the light receiving section 13 converted by the light receiving control section/driving control section 16, as the maximum light intensity value A of the lit light emitting element (step S78).

The control section 17a adds 2 to the reference element number n (step S79) and allows the light receiving control section/driving control section 16 to drive the driving section 14 to move the light receiving section 13 to a position corresponding to the reference element number n (step S80). The control section 17a obtains the light intensity measurement value P(n), which is the light intensity value of the light received by the light receiving section 13 converted by the light receiving control section/driving control section 16, as the minimum light intensity value B of the light emitting element lit in step S77 (step S81).

The control section 17a calculates the common MTF value MTF (n−2 to n+1) of reference element number n−2 to n+1 and reference element number n based on the maximum light intensity value A obtained in step S78 and minimum light intensity value B obtained in step S81 (step S82). The MTF value of step S82 is calculated by the following formula (5).

$$MTF(n-2 \text{ to } n+1) = \{(A-B)/(A+B)\} \times 100 [\%] \quad (5)$$

The control section 17a judges whether or not the reference element number n is the last element number (step S83). In step S83, when the reference element number n is not the last element number (step S83; NO), 2 is added to the reference element number n (step S84) and the processing returns to step S76. When the reference element number n is the last element number (step S83; YES), the MTF measurement processing of simplified processing with the lighting pattern of 1 (ON)-3 (OFF) ends.

Figure 11:
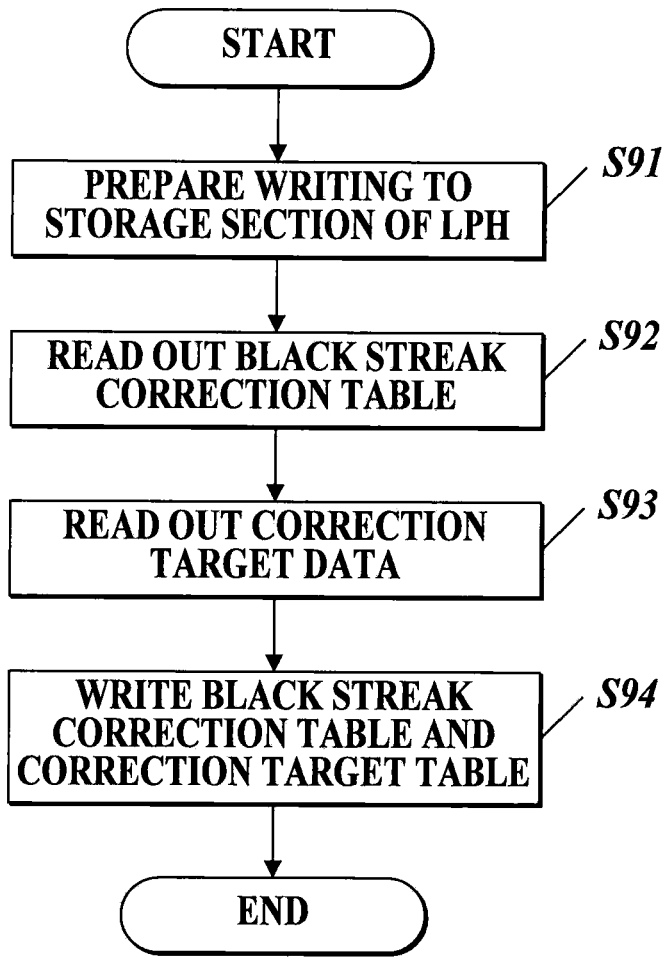
FIG. 11 is a flowchart showing correction data writing processing performed by the LPH inspection apparatus.

FIG. 11 is a flowchart showing the correction data writing processing performed in the LPH inspection apparatus 1. The processing shown in FIG. 11 is performed by the control section 17a in conjunction with each section.

The control section 17a performs preparation of data writing to the storage section 31 in the LPH 3 (step S91). In step S91, the control section 17a establishes communication connection with the storage section 31 of the LPH 3 through the LPH control section 15.

The control section 17a reads out the black streak correction table from the memory 17b (step S92), then also reads out the correction target data from the memory 17b (step S93), writes the black streak correction table and the correction target table to the storage section 31 of the LPH 3 (step S94) and ends the processing.

FIG. 12 shows an example of a memory configuration of the storage section 31 of the LPH 3.

As shown in FIG. 12, the memory area of the storage section 31 is divided into two areas (bank A, bank B). Each bank is further divided into two areas.

The bank A is composed of divided area A1 with memory addresses of "0000h" to "2FFFh" and divided area A2 with memory addresses of "3000h" to "7FFFh". The divided area A1 stores the basic correction table. The divided area A2 stores the basic correction table and adjustment data.

The bank B is composed of divided area B1 with memory addresses of "8000h" to "AFFFh" and divided area B2 with memory addresses of "B000h" to "FFFFh". The divided areas B1 and B2 each store both the basic correction table and adjustment data.

In the present embodiment, the black streak correction table and correction target data stored in the storage section 31 in step S94 are stored in the divided area B1 or B2 of the bank B as adjustment data.

FIG. 13 shows a data format example of correction target data stored in the divided area B1 of bank B. The data format example shown in FIG. 13 is each piece of correction target data in a format of 8 Bytes and a maximum of six pieces of correction target data (PP1 to PP6) can be stored.

As shown in FIG. 13, the peak value MP, peak element number PP, starting element number SP and end element number EP are respectively allocated in areas of 2 Bytes with two addresses from the upper address.

The peak value MP is stored in the memory address "8001h". When the peak value is not detected, "77h" is stored. In FIG. 13, 2 (=02h) is stored as the peak value MP.

The peak element number PP is stored in the memory addresses "8002h" and "8003h". In FIG. 13, 11835 (2Eh in the memory address "8002h" and 3Bh in the memory address "8003h") is stored as the peak element number PP.

The starting element number SP is stored in the memory addresses "8004h" and "8005h". In FIG. 13, 11809 (2Eh in the memory address "8004h" and 21h in the memory address "8005h") is stored as the starting element number SP.

The end element number EP is stored in the memory addresses "8006h" and "8007h". In FIG. 13, 11857 (2Eh in the memory address "8006h" and 51h in the memory address "8007h") is stored as the end element number EP.

Figure 14A:
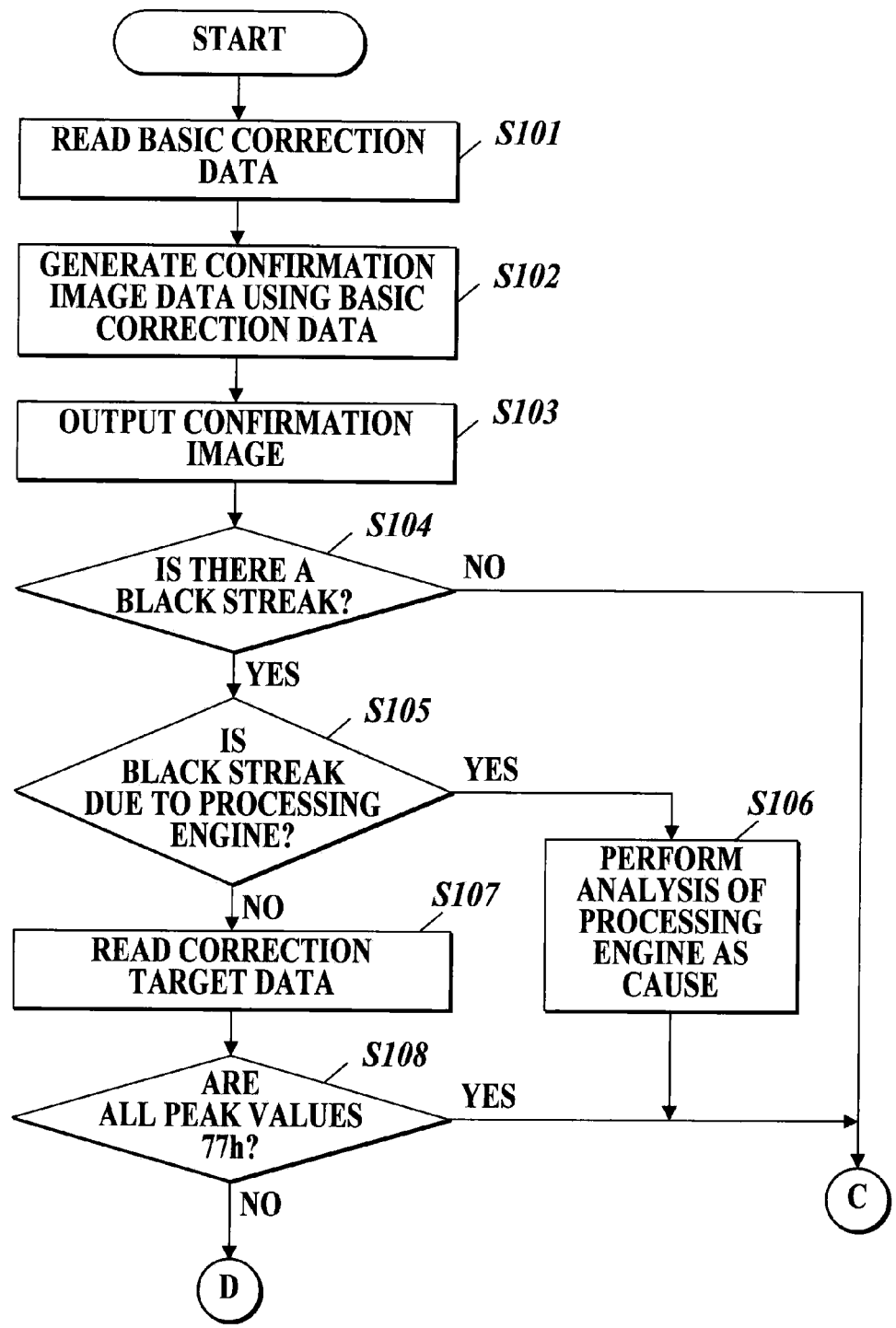
FIGS. 14A and 14B are a flowchart showing an LPH adjustment processing.
Figure 14B:
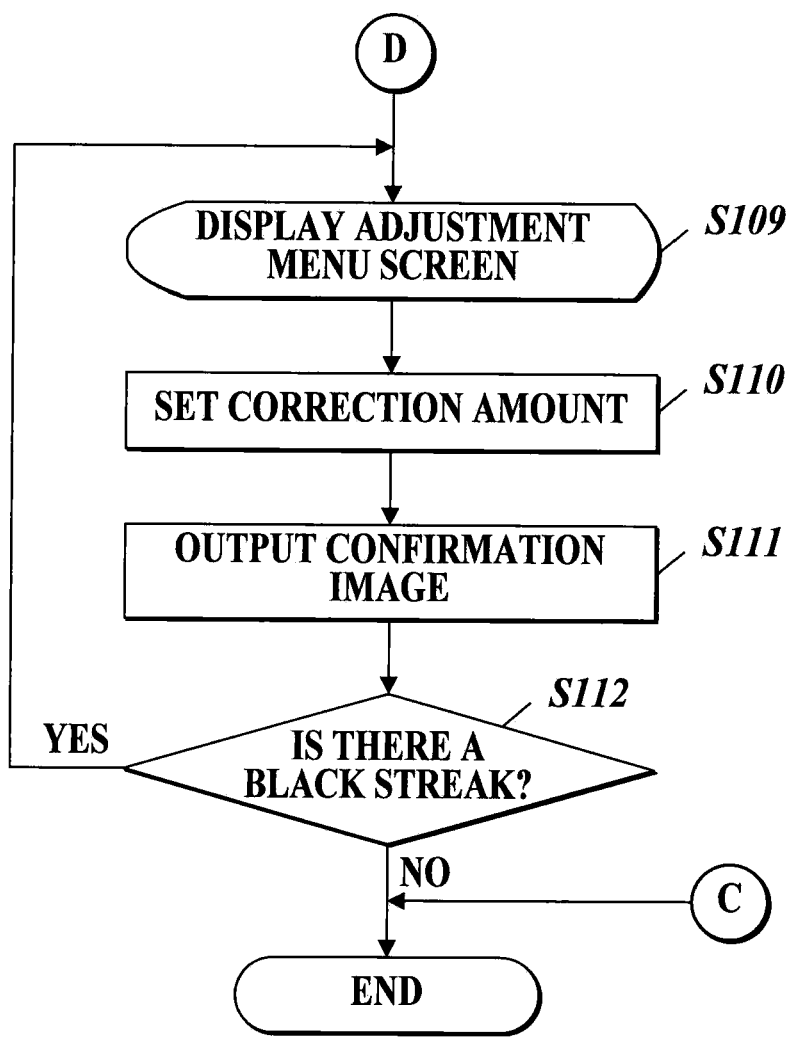

FIG. 14 shows a flow chart of the LPH adjustment processing of the present embodiment.

The processing shown in FIG. 14 is a processing performed in the image forming apparatus 2, and is performed by the CPU 21 in conjunction with each section.

The CPU 21a reads the basic correction table from the storage section 31 of the LPH 3 through the I/O 21g (step S101) and stores the table in the light intensity correction data memory of the image memory 21d. In step S101, the basic correction table stored in, for example, the divided area A1 of the bank A of the storage section 31 is read out.

The CPU 21a generates confirmation image data using the basic correction table read out in step S101 and outputs the confirmation image data to the image processing section 21e (step S102). The image processing section 21e generates the print data based on the confirmation image data and various signals based on the print data is output by the LPH control section 21f to the LPH 3.

The LPH 3 is driven based on the signal input from the LPH control section 21f and the print section 4 forms and outputs the confirmation image on a sheet (step S103).

Figure 15:
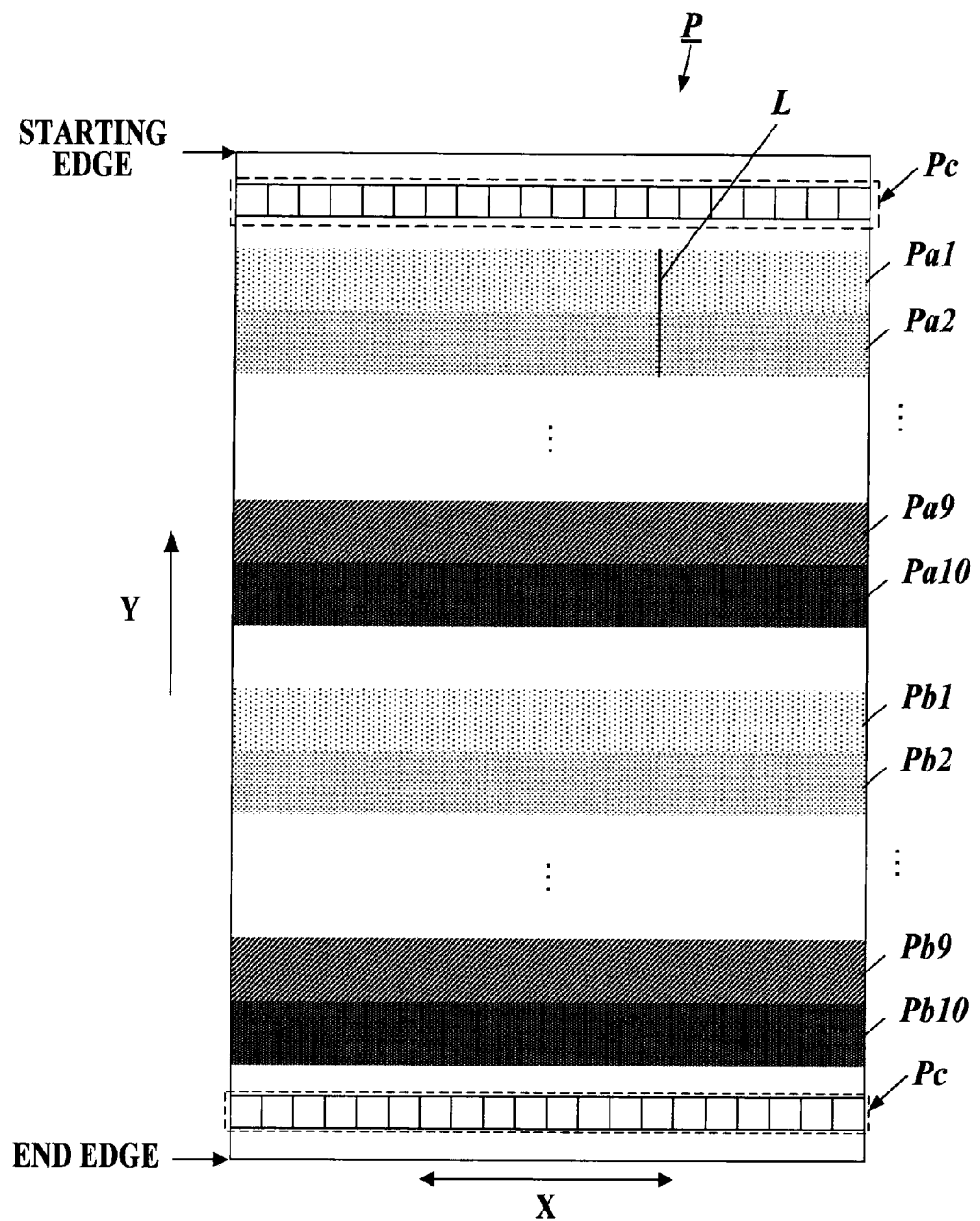
FIG. 15 is a diagram showing an example of a confirmation image formed on a sheet.

FIG. 15 shows an example of a confirmation image P formed on a sheet.

As shown in FIG. 15, the confirmation image P is composed of first band images Pa1 to Pa10, second band images Pb1 to Pb10 and adjustment position image Pc. The first band images Pa1 to Pa10 and the second band images Pb1 to Pb10 have different screen lines and screen angles.

The example of the confirmation image P shown in FIG. 15 is an example when black streak L appears.

The first band images Pa1 to Pa10 have a different density from the first band images adjacent in the sub-scanning direction Y. The first band images Pa1 to Pa10 are aligned so that the density of each first band image becomes dense or sparse in order in a unit of 10[%] in the sub-scanning direction (paper conveying direction) Y from the starting edge to the end edge. Also, it is preferable that the first band image Pa1 to Pa10 have 141 lines of screen line and a screen angle of 45 degrees.

The second band images Pb1 to Pb10 have a different density from the second band images adjacent in the sub-scanning direction Y. The second band images Pb1 to Pb10 are aligned so that the density of each second band image becomes dense or sparse in order in a unit of 10[%] in the sub-scanning direction (paper conveying direction) Y from the starting edge to the end edge. Also, it is preferable that the second band image Pb1 to Pb10 have 175 lines of screen line and a screen angle of 15 degrees.

The adjustment position image Pc is formed with band images extending in the main scanning direction X in a position near both edge sections (starting edge and end edge) of the paper conveying direction Y and lines to divide the length of the band image in the main scanning direction with previously set spacing in between.

The spacing to divide the band image corresponds to the length of the light emitting elements arranged in the main scanning direction included in the LPH 3 divided in a unit of a previously set number. For example, when 15360 elements of light emitting elements are arranged in the main scanning direction and the light emitting elements are divided with respect to every 384 elements, lines to divide the band image into 40 blocks are formed.

Therefore, the adjustment position image Pc is a guide for judging the position of the main scanning direction where the black streak appears in the first band image and the second band image.

The output confirmation image is checked by sight by the operator operating the image forming apparatus 2 performing the processing and the operator judges whether or not a black streak appears on the confirmation image (step S104). When it is judged that the black streak has not appeared on the confirmation image (step S104; NO), the judgment result is input on the operation/display section 23 and the LPH adjustment processing ends.

When it is judged that the black streak has appeared on the confirmation image (step S104; YES), the operator judges whether or not the black streak appeared due to a processing engine (step S105). In step S105, the operator judges whether or not the processing engine is the cause by judging the shape of the black streak. A black streak which is not due to the processing engine, in other words a black streak appearing due to the lens array of the LPH 3 is known to have a width of about 1 mm (a length about two times the diameter of the coupled lens). Also, a black streak which appears due to the processing engine has a width wider than that of the black streak due to the lens array and is a streak depending on the components of the apparatus.

When the black streak appears due to the processing engine (step S105; YES) the judgment result is input on the operation/display section 23, the analysis processing is performed with the processing engine as the cause (step S106), and the LPH adjustment processing ends. At this time, it is preferable that the black streak information of the LPH side is compared with the image to confirm the cause is separate from the LPH and is due to the processing engine.

When the processing engine is not the cause of the black streak (step S105; NO), the judgment result is input on the operation/display section. When the judgment result that the black streak is not due to the processing engine is input, the CPU 21a reads the correction target data stored in the storage section 31 of the LPH 3 (step S107) and stores the data in the light intensity correction data memory of the image memory 21d. In step S107, the correction target data stored in, for example, the divided area B1 of the bank B of the storage section 31 is read out.

The CPU 21a judges whether or not all of the peak values MP of the read correction target data are "77h" (step S108). When all of the peak values MP of the correction target data are "77h" (step S108; YES), the CPU 21a determines that the correction target data shows the adjustment unnecessary information which shows that there is no data to correct the optical characteristics of the coupled lens, and the LPH adjustment processing ends.

When it is judged YES in step S108, the display of correction target data and reception of adjustment instruction information is not performed, and the image based on the basic correction table can be formed.

When the peak values MP of the correction target data are not all "77h" (step S108; NO), the CPU 21a displays the adjustment menu screen on the operation/display section 23 (step S109).

Figure 16:
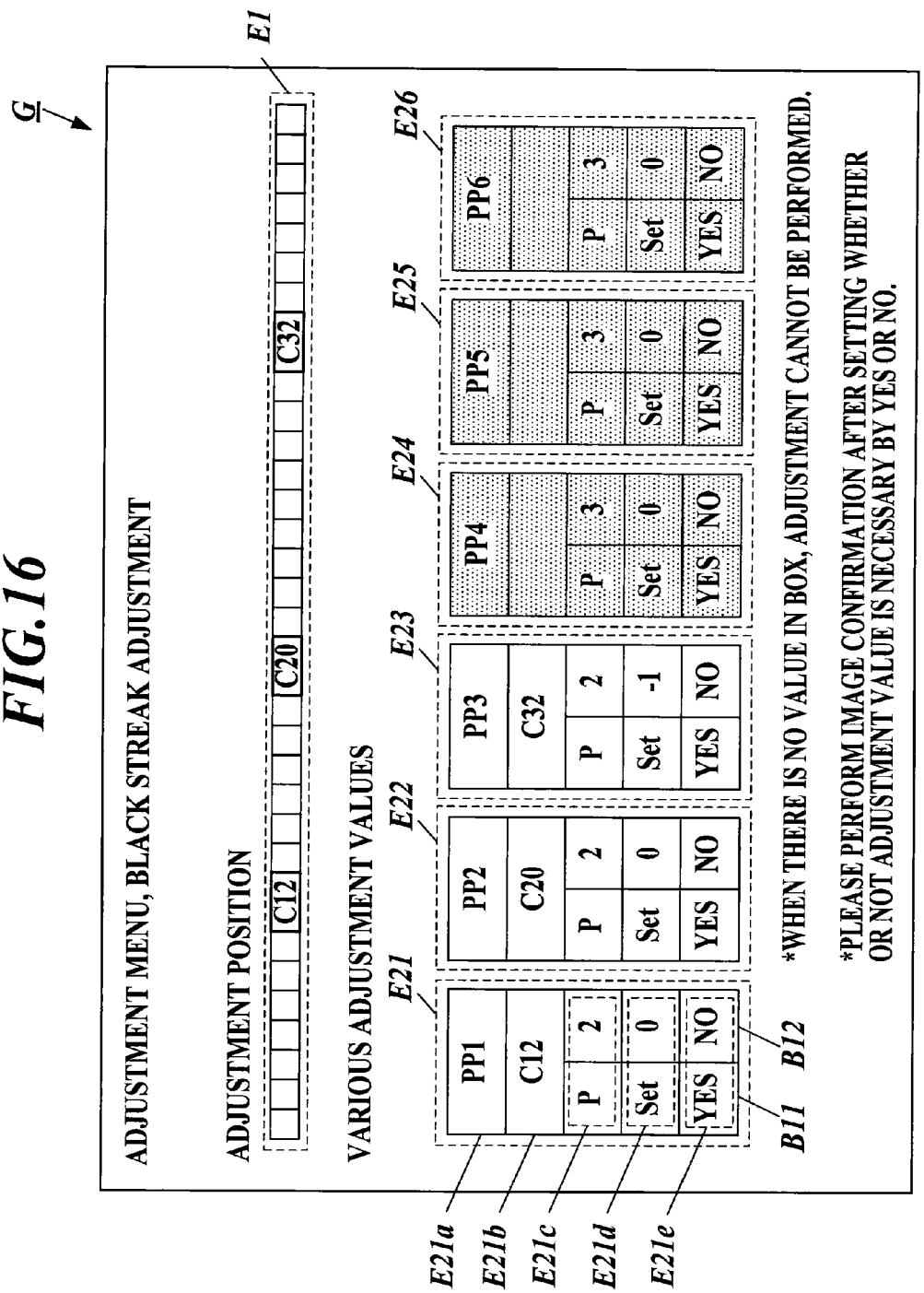
FIG. 16 is a diagram showing an example of an adjustment menu screen.

FIG. 16 shows an example of the adjustment menu screen.

As shown in FIG. 16, the adjustment menu screen G is provided with an adjustment position image area E1, adjustment value setting area E21 to E26. The adjustment menu screen G receives adjustment instruction information for the correction target data.

An adjustment position image similar to the adjustment position image Pc formed in the confirmation image is displayed in the adjustment position image area E1, and the block number of the block of the adjustment position image including the peak element number PP of the correction target data is displayed on the adjustment position image.

Data number display area E21a, block number display area E21b, peak value display area E21c, adjustment value display area E21d and adjustment necessity setting area E21e are provided in the adjustment value setting area E21. The adjustment value setting area E22 to E26 are the same structure as that of the adjustment value setting area E21, and thus the description is omitted.

The identification number of the correction target data is shown in the data number display area E21a.

The identification number of the correction target data is the number applied when the correction target data is stored in the storage section 31, for example, PP1 to PP6 shown in FIG. 13.

The block number of the block of the correction target position image including the correction target block of the correction target data is shown in the block number display area E21b.

The peak value MP of the correction target data is shown in the peak value display area E21c.

The adjustment value to change the peak value MP to the peak value MP or lower is shown in the adjustment value display area E21d.

The YES button B11 and the NO button B12 are provided in the adjustment necessity setting area E21e. When the YES button B11 is depressed, an instruction to perform the adjustment of the light intensity correction value of the basic correction table using the correction target data is input, and the value input by the numeric keys is set as the adjustment value. When the NO button B12 is depressed, an instruction not to perform the adjustment of the light intensity correction value of the basic correction table using the correction target data is input.

Therefore, an instruction of necessity of adjustment of the light intensity correction value of the basic correction table by depressing the YES button B11 or the NO button B12 and adjustment value input by the numeric keys are received on the adjustment menu screen G as the adjustment instruction information.

The CPU 21a performs setting of the correction amount to correct the light intensity correction value according to the adjustment value of each piece of correction target data input on the adjustment menu screen G (step S110). The setting of the correction amount is described with reference to FIG. 17.

Figure 17:
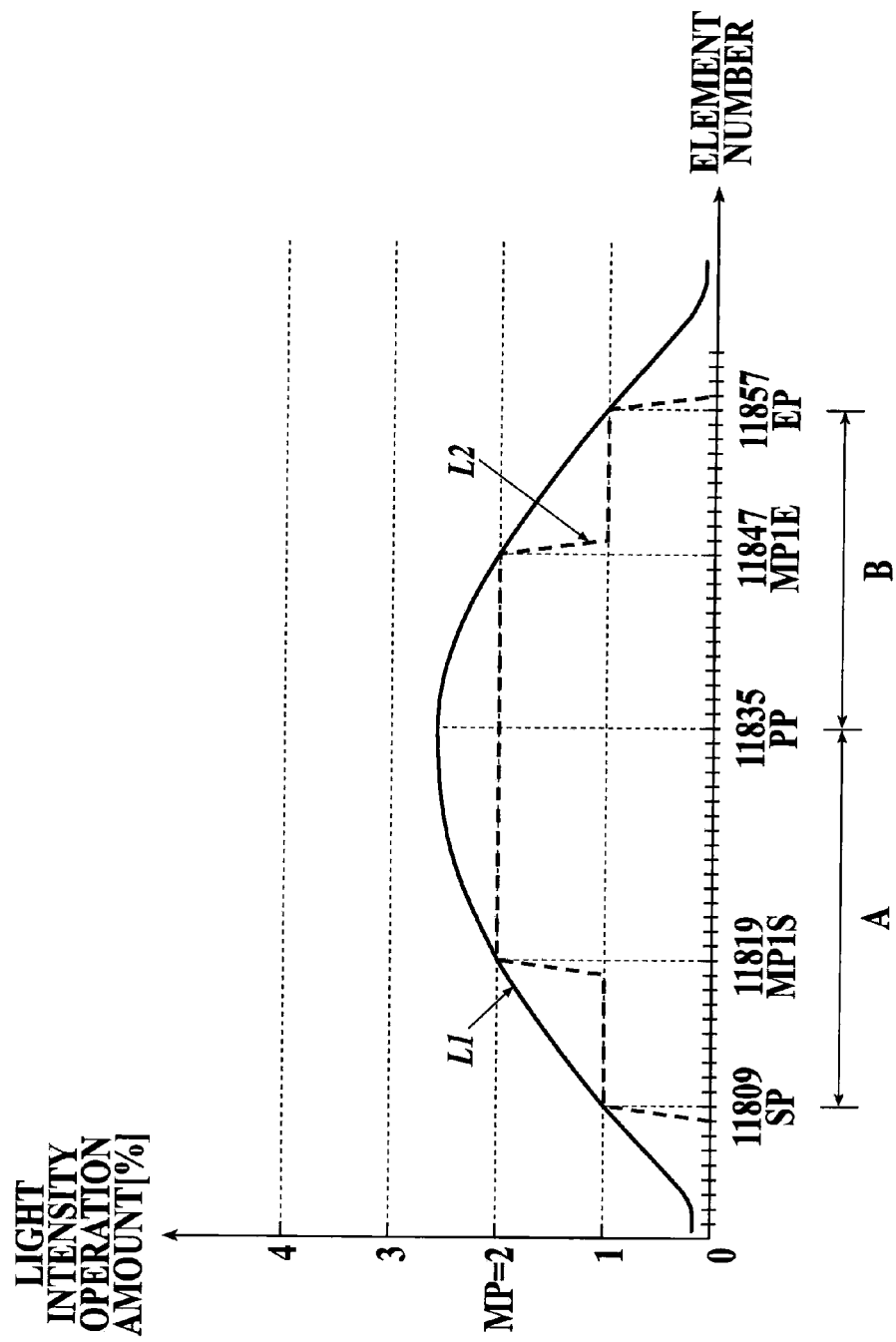
FIG. 17 is a graph showing a light intensity operation amount on each light emitting element.

FIG. 17 is a graph showing the light intensity operation amount on each light emitting element.

In the graph shown in FIG. 17, the horizontal axis shows the element number and the vertical axis shows the light intensity operation amount [%].

The light intensity operation amount of each light emitting element corresponds to the fourth calculation value MTF t(n).

The first curve L1 is a graph showing the difference value MTF d(n) and the second curve L2 is the graph showing the fourth calculation value MTF t(n).

According to the graph shown in FIG. 17, the correction target data where the peak value MP is 2, the peak element number PP is 11835, the starting element number SP is 11809 and the end element number EP is 11857 is detected.

First, the block where the light intensity operation amount is 1 is set.

The block where the light intensity operation amount is 1 is the correction target block. In FIG. 17, the block where the light intensity operation amount is 1 is 11809 to 11857.

Next, the block where the light intensity operation amount is 2 is set.

The block where the light intensity operation amount is 2 is a block of the peak value MP.

In the present embodiment, when the resolution of the LPH 3 is 1200 dpi, the diameter of the coupled lens corresponds to the length of about 25 to 27 elements arranged in a line. Therefore, the radius of the coupled lens corresponds to the length of about 12 elements arranged in a line. First, a range of ±12 elements (corresponding to the diameter of the coupled lens) with the peak element number PP as the center is to be a temporary block of the peak value MP. In FIG. 17, the temporary block of the peak value MP is 11823 to 11847.

In the block of the peak value MP, the smallest element number is referred to as the peak block starting number MP1S, and the largest element number is referred to as the peak block end number MP1E.

It is presumed that the coupled lens is tilted from where the black streak appears. When the coupled lens is tilted, the distance from the central axis to the circumferential face of the coupled lens is unequal on a cross sectional plane of the coupled lens. Therefore, the number of elements (first number of elements A) from the peak element number PP to the starting element number SP and the number of elements (second number of elements B) from the peak element number PP to the end element number EP do not match. The difference between the first number of elements A and the second number of elements B (third number of elements C) is calculated. The third number of elements C corresponds to the tilt of the coupled lens.

When the first number of elements A is larger than the second number of elements B, it is presumed that the distance from the peak element number PP to the starting element number SP is longer than the distance from the peak element number PP to the end element number EP, and that the coupled lens is tilted to the starting element number SP side. Therefore, the element number obtained by subtracting the third number of elements C from the peak block starting number of the temporary block of the peak value is to be the peak block starting number MP1S.

In FIG. 17, the third number of elements C (4) subtracted from the peak block starting number (11823) of the temporary block of the peak value MP results in 11819, and this is to be the peak block starting number MP1S. Therefore, the block of the peak value MP is 11819 to 11847.

When the first number of elements A is smaller than the second number of elements B, it is presumed that the distance from the peak element number PP to the starting element number SP is shorter than the distance from the peak element number PP to the end element number EP and the coupled lens is tilted to the end element number EP side. Therefore, the element number obtained by adding the third number of elements C to the peak block end number of the temporary block of the peak value is to be the peak block end number MP1E.

For example, the third number of elements C (4) added to the peak block end number (11847) results in 11851 and this is to be the peak block end number MP1E. In this case, the block of the peak value MP is 11823 to 11851.

After the block of each light intensity operation amount is determined, the setting of the correction amount of the light intensity correction value to the light emitting element of each correction target block according to the adjustment amount is performed.

Figure 18:
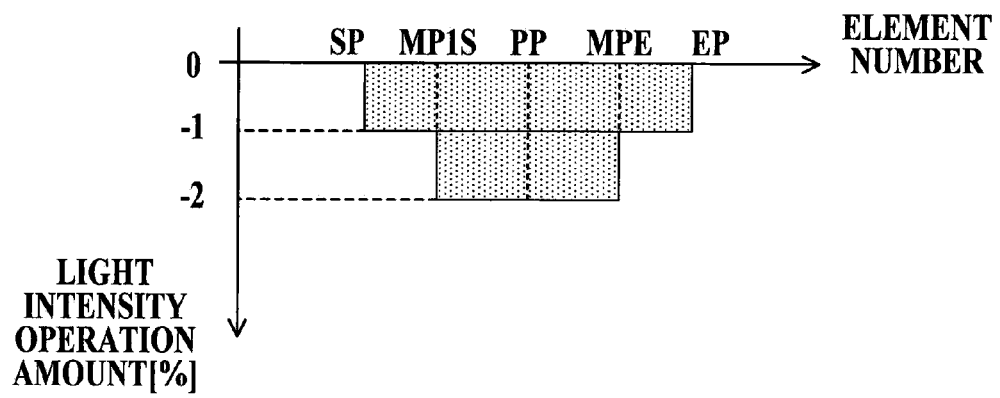
FIG. 18 is a conceptual diagram showing a correction amount when an adjustment amount is 0.

FIG. 18 shows a conceptual diagram of the correction amount when the adjustment amount is 0.

When the adjustment amount is zero, the maximum value of the light intensity operation amount is the peak value MP (2).

The correction amount to the light intensity correction value of the light emitting element of the block with the maximum value of the light intensity operation amount, in other words, the block from the peak block starting number MP1S to peak block end number MP1E, is set to −2 [%] according to the peak value MP. Then, the light intensity correction value of the light emitting element of the block from the peak block starting number MP1S to the peak block end number MP1E is corrected to a value −2% from the light intensity correction value of the block stored in the basic correction table.

Also, the correction amount to the light intensity correction value of the light emitting element of the block with the light intensity operation amount second largest to the maximum value of the light intensity operation amount, in other words, the blocks from the starting element number SP to the peak block starting number MP1S and from the peak block end number MP1E to the end element number EP, is set to −1[%] according to the light intensity operation amount of the block. Then, the light intensity correction value of the light emitting element of the blocks from the starting element number SP to the peak block starting number MP1S and from the peak block end number MP1E to the end element number EP is corrected to a value −1[%] from the light intensity correction value of the block stored in the basic correction table.

Figure 19:
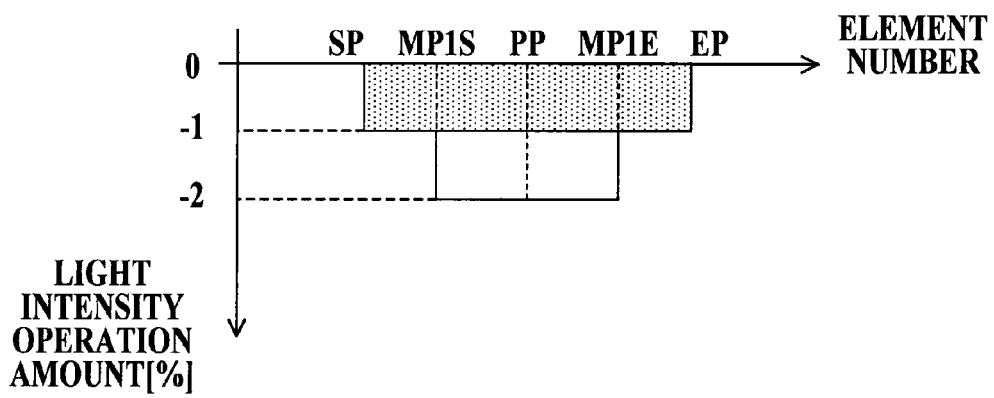
FIG. 19 is a conceptual diagram showing a correction amount when an adjustment amount is −1.

FIG. 19 shows a conceptual diagram of the correction amount when the adjustment amount is −1.

When the adjustment amount is −1, the maximum value of the light intensity operation amount is a value (1)−1 from the peak value MP (2).

The correction amount to the light intensity correction value of the light emitting element of the block with the maximum value of the light intensity operation amount, in other words, the block from the starting element number SP to the end element number EP is set to −1[%] according to the adjusted peak value MP. Then, the light intensity correction value of the light emitting element of the block from the starting element number SP to the end element number EP is corrected to a value −1[%] from the light intensity correction value of the block stored in the basic correction table.

Incidentally, when the adjustment amount is set to −1 when the peak value MP is 2 as shown in FIG. 19, the correction amount according to the peak value MP is not applied to the correction amount of the block with the peak value MP (the block from the peak block starting number MP1S to the peak block end number MP1E).

As described above, the CPU 21a divides the correction target block (SP to EP) to a plurality of blocks (block with peak value MP=2, block with peak value MP=1) according to the peak value MP based on the correction target data (peak value MP, peak element number PP, starting element number SP, and end element number EP). Then, the CPU 21a sets the correction amount (−2[%], −1[%]) to correct the first correction data of the light emitting element included in the block with respect to each divided block and changes the correction amount with respect to each divided block according to the adjustment value.

After setting the correction amount (after step S110), the CPU 21a generates the confirmation image data with the light intensity correction value of the light emitting element of the correction target block of the correction target data where the YES button B11 of the adjustment necessity setting area is depressed on the adjustment menu screen G as the light intensity correction value corrected based on the set correction amount and the other blocks as the light intensity correction value of the basic correction table, and outputs the confirmation image data to the image processing section 21e. The image processing section 21e generates the print data based on the confirmation image data and the LPH control section 21f outputs various signals based on the print data to the LPH 3. Then, the LPH 3 is driven based on the signal input from the LPH control section 21f and the confirmation image is formed on the sheet and the sheet is output by the print section 4 (step S111).

The output confirmation image is checked by sight by the operator and the operator judges whether or not the black streak appeared on the confirmation image (step S112). When it is judged that the black streak has appeared on the confirmation image (step S112; YES), the judgment result is input on the operation/display section 23 and the CPU 21a returns the processing to step S109.

When it is judged that the black streak has not appeared on the confirmation image (step S112; NO), the judgment result is input on the operation/display section 23 and the CPU 21a ends the LPH adjustment processing.

As described above, according to the present embodiment, the light intensity correction value of the basic correction table to correct the light intensity of the light emitting element can be corrected based on the correction target data for correcting optical characteristics of the predetermined coupled lens. Consequently, sectional adjustment of the light intensity can be performed on the light emitting element included in the LPH and the image quality can be enhanced.

Also, the confirmation image formed using the light intensity correction value of the basic correction table corrected based on the correction target data can be formed on the sheet and the sheet can be output. Consequently, the operator can confirm whether or not the image quality is image quality desired by the user with the confirmation image formed on the output sheet.

Further, the light intensity correction value of the correction target block of the basic correction table can be corrected based on the peak value MP, peak element number PP, starting element number SP and the end element number EP.

Also, the correction target data can be adjusted based on the adjustment instruction information (instruction of necessity of adjustment of the light intensity correction value of the basic correction table, adjustment value) received by the adjustment menu screen G, and consequently, an image with the image quality desired by the user can be realized.

The above description describes an example using the nonvolatile memory 21b as the computer readable medium including the program of the present invention, however the example is not limited to the above. As other computer readable medium, nonvolatile memory such as flash memory, portable recording medium such as CD-ROM, or the like can be applied. Also, as a medium to provide data of the program of the present invention through communication lines, carrier waves can also be used in the present invention.

Also, the present invention is not limited to the above described embodiments and can be suitably modified without leaving the scope of the invention.

According to an aspect of the preferred embodiments of the present invention, there is provided an image forming apparatus including:

an optical writing device including:

a light source section composed of a plurality of light emitting elements arranged in a main scanning direction;

an optical section including a plurality of coupled lenses to form an image on a light exposure face by gathering light emitted from the light emitting elements; and a storage section to store first correction data for correcting the light intensity of the plurality of light emitting elements and second correction data for correcting an optical characteristic specific to the coupled lens, and a control section to read out the first correction data and the second correction data from the storage section of the optical writing device and to correct the first correction data based on the second correction data.

According to another aspect of the preferred embodiments of the present invention, there is provided a light intensity correction method for an image forming apparatus including an optical writing device including: a light source section composed of a plurality of light emitting elements arranged in a main scanning direction; an optical section including a plurality of coupled lenses to form an image on a light exposure face by gathering light emitted from the light emitting elements; and a storage section to store first correction data for correcting the light intensity of the plurality of light emitting elements and second correction data for correcting an optical characteristic specific to the coupled lens, the method including:

reading out the first correction data and the second correction data from the storage section of the optical writing device; and correcting the first correction data based on the second correction data.

According to the image forming apparatus and the light intensity correction method of the present embodiment, the first correction data for correcting the light intensity of the light emitting element can be corrected based on the second correction data for correcting optical characteristics of the coupled lens. Consequently, a sectional adjustment of the light intensity of the light emitting element included in the LPH can be performed, and the image quality can be enhanced.

Preferably, the image forming apparatus further includes:

an image forming section to form an image on a sheet based on image data by using the optical writing device, wherein the control section generates image data for image quality confirmation which uses the first correction data corrected based on the second correction data and the image forming section forms an image based on the generated image data for image quality confirmation.

Preferably, the light intensity correction method further includes:

generating image data for image quality confirmation which uses the first correction data corrected based on the second correction data; and forming an image based on the generated image data for image quality confirmation with the image forming section which forms an image on a sheet by using the optical writing device.

Consequently, an image formed using the first correction data corrected based on the second correction data can be formed, and image quality confirmation of whether or not the image meets the image quality desired by the user can be performed with the formed image.

Preferably, the image forming apparatus further includes:

an operation/display section to display the second correction data and to receive adjustment instruction information to adjust the second correction data, wherein the control section adjusts the second correction data according to the adjustment instruction information input from the operation/display section and corrects the first correction data based on the adjusted second correction data.

Preferably, the light intensity correction method further includes:

adjusting the second correction data according to adjustment instruction information input from an operation/display section which displays the second correction data and receives the adjustment instruction information to adjust the second correction data; and correcting the first correction data based on the adjusted second correction data.

Consequently, the second correction data can be adjusted based on the adjustment instruction information.

Preferably, in the image forming apparatus, the control section does not allow the operation/display section to display the second correction data and to receive the adjustment instruction information when the second correction data is adjustment unnecessary information which shows there is no data for correcting the optical characteristic of the coupled lens.

Preferably, in the light intensity correction method, the operation/display section does not display the second correction data and does not receive the adjustment instruction information when the second correction data is adjustment unnecessary information which shows there is no data for correcting the optical characteristic of the coupled lens.

Consequently, when the second correction data is adjustment unnecessary information, the image can be formed based on the first correction image without displaying the second correction data or receiving the adjustment instruction information.

Preferably, in the image forming apparatus, the second correction data includes block information to show a block where a light emitting element in which light intensity changes due to optical characteristic of the coupled lens is arranged; and the control section corrects the first correction data corresponding to the light emitting element included in the block based on the second correction data.

Preferably, in the light intensity correction method, the second correction data includes block information to show a block where a light emitting element in which light intensity changes due to optical characteristic of the coupled lens is arranged, the method further includes:

correcting the first correction data corresponding to the light emitting element included in the block based on the second correction data.

Consequently, the first correction data corresponding to the light emitting element included in the block where the light intensity changes due to the optical characteristics of the coupled lens can be corrected.

Preferably, in the image forming apparatus, the light emitting elements are each assigned an identification number to identify each light emitting element;

the block information includes a first edge element number to show the identification number of the light emitting element at a first edge of the block and a second edge element number to show the identification number of the light emitting element at a second edge of the block;

the second correction data includes: a maximum value of a value calculated based on characteristic data of the light emitting element of the block; and a maximum element number to show the identification number of the light emitting element corresponding to the maximum value; and the control section corrects the first correction data corresponding to the light emitting element included in the block from the first edge element number to the second edge element number based on the maximum value, the maximum element number, the first edge element number and the second edge element number.

Preferably, in the light intensity correction method, the light emitting elements are each assigned an identification number to identify each light emitting element;

the block information includes a first edge element number to show the identification number of the light emitting element at a first edge of the block and a second edge element number to show the identification number of the light emitting element at a second edge of the block;

the second correction data includes: a maximum value of a value calculated based on characteristic data of the light emitting element of the block; and a maximum element number to show the identification number of the light emitting element corresponding to the maximum value, the method further includes:

correcting the first correction data corresponding to the light emitting element included in the block from the first edge element number to the second edge element number based on the maximum value, the maximum element number, the first edge element number and the second edge element number.

Consequently, the first correction data can be corrected based on the maximum value, maximum element number, one edge element number and the other edge element number.

Preferably, in the image forming apparatus, the adjustment instruction information includes an adjustment value to change the maximum value to the maximum value or less; and the control section adjusts the second correction data according to the adjustment value.

Preferably, in the light intensity correction method, the adjustment instruction information includes an adjustment value to change the maximum value to the maximum value or less, the method further including:

adjusting the second correction data according to the adjustment value.

Consequently, the second correction data can be adjusted according to the adjustment value.

Preferably, in the image forming apparatus, the control section divides the block into a plurality of blocks according to the maximum value based on the block information, the maximum value and the maximum element number, sets a correction amount to correct the first correction data of the light emitting element included in the block with respect to each of the divided blocks, and changes the correction amount with respect to each of the divided blocks according to the adjustment value.

Preferably, the light intensity correction method further includes:

dividing the block into a plurality of blocks according to the maximum value based on the block information, the maximum value and the maximum element number;

setting a correction amount to correct the first correction data of the light emitting element included in the block with respect to each of the divided blocks; and changing the correction amount with respect to each of the divided blocks according to the adjustment value.

Consequently, the block where the first correction data is corrected can be divided into a plurality of blocks and the correction amount can be set with respect to each divided block according to the adjustment value.

Although various exemplary embodiments have been shown and described, the invention is not limited to the embodiments shown. Therefore, the scope of the invention is intended to be limited solely by the scope of the claims that follow and not by the above explanation, and it is intended that the present invention covers modifications and variations that come within the scope of the appended claims and their equivalents.

The present U.S. patent application claims priority under the Paris Convention of Japanese Patent Application No. 2008-299440 filed on Nov. 25, 2008 to the Japanese Patent Office, which shall be a basis for correcting mistranslations.

What is claimed is:

1. An image forming apparatus comprising:
 an optical writing device including:
  a light source section composed of a plurality of light emitting elements arranged in a main scanning direction;
  an optical section including a plurality of coupled lenses to form an image on a light exposure face by gathering light emitted from the light emitting elements; and
  a storage section that stores first correction data that corrects the light intensity of the plurality of light emitting elements and second correction data that corrects an optical characteristic specific to the coupled lens, and
 a control section including a central processing unit configured to read out the first correction data and the second correction data from the storage section of the optical writing device, and to correct the first correction data based on the second correction data,
  wherein the second correction data includes block information to show a block where a light emitting element in which light intensity changes due to optical characteristic of the coupled lens is arranged; and
  the control section corrects the first correction data corresponding to the light emitting element included in the block based on the second correction data.

2. The image forming apparatus of claim 1, further comprising:
 an image forming section to form an image on a sheet based on image data by using the optical writing device,
 wherein
 the control section generates image data for image quality confirmation which uses the first correction data corrected based on the second correction data and the image forming section forms an image based on the generated image data for image quality confirmation.

3. The image forming apparatus of claim 1, further comprising:
 an operation/display section to display the second correction data and to receive adjustment instruction information to adjust the second correction data, wherein
 the control section adjusts the second correction data according to the adjustment instruction information input from the operation/display section and corrects the first correction data based on the adjusted second correction data.

4. The image forming apparatus of claim 3, wherein the control section does not allow the operation/display section to display the second correction data and to receive the adjustment instruction information when the second correction data is adjustment unnecessary information which shows there is no data for correcting the optical characteristic of the coupled lens.

5. The image forming apparatus of claim 1, wherein the second correction data includes block information to show a block where a light emitting element in which light intensity changes due to optical characteristic of the coupled lens is arranged; and the control section corrects the first correction data corresponding to the light emitting element included in the block based on the second correction data.

6. The image forming apparatus of claim 1, wherein the light emitting elements are each assigned an identification number to identify each light emitting element;

the block information includes a first edge element number to show the identification number of the light emitting element at a first edge of the block and a second edge element number to show the identification number of the light emitting element at a second edge of the block;

the second correction data includes: a maximum value of a value calculated based on characteristic data of the light emitting element of the block; and a maximum element number to show the identification number of the light emitting element corresponding to the maximum value; and the control section corrects the first correction data corresponding to the light emitting element included in the block from the first edge element number to the second edge element number based on the maximum value, the maximum element number, the first edge element number and the second edge element number.

7. The image forming apparatus of claim 6, wherein the adjustment instruction information includes an adjustment value to change the maximum value to the maximum value or less; and the control section adjusts the second correction data according to the adjustment value.

8. The image forming apparatus of claim 7, wherein the control section divides the block into a plurality of blocks according to the maximum value based on the block information, the maximum value and the maximum element number, sets a correction amount to correct the first correction data of the light emitting element included in the block with respect to each of the divided blocks, and changes the correction amount with respect to each of the divided blocks according to the adjustment value.

9. A computerized light intensity correction method for an image forming apparatus including an optical writing device including: a light source section composed of a plurality of light emitting elements arranged in a main scanning direction; an optical section including a plurality of coupled lenses to form an image on a light exposure face by gathering light emitted from the light emitting elements; and a storage section that stores first correction data that corrects the light intensity of the plurality of light emitting elements and second correction data that corrects an optical characteristic specific to the coupled lens, the computerized method comprising:

reading out the first correction data and the second correction data from the storage section of the optical writing device; and correcting the first correction data based on the second correction data, wherein the second correction data includes block information to show a block where a light emitting element in which light intensity changes due to optical characteristic of the coupled lens is arranged, the method further comprising:

correcting the first correction data corresponding to the light emitting element included in the block based on the second correction data.

10. The light intensity correction method of claim 9, further comprising:

generating image data for image quality confirmation which uses the first correction data corrected based on the second correction data; and forming an image based on the generated image data for image quality confirmation with the image forming section which forms an image on a sheet by using the optical writing device.

11. The light intensity correction method of claim 9, further comprising:

adjusting the second correction data according to adjustment instruction information input from an operation/display section which displays the second correction data and receives the adjustment instruction information to adjust the second correction data; and correcting the first correction data based on the adjusted second correction data.

12. The light intensity correction method of claim 11, wherein the operation/display section does not display the second correction data and does not receive the adjustment instruction information when the second correction data is adjustment unnecessary information which shows there is no data for correcting the optical characteristic of the coupled lens.

13. The light intensity correction method of claim 9, wherein the second correction data includes block information to show a block where a light emitting element in which light intensity changes due to optical characteristic of the coupled lens is arranged, the method further comprising:

correcting the first correction data corresponding to the light emitting element included in the block based on the second correction data.

14. The light intensity correction method of claim 9, wherein the light emitting elements are each assigned an identification number to identify each light emitting element;

the block information includes a first edge element number to show the identification number of the light emitting element at a first edge of the block and a second edge element number to show the identification number of the light emitting element at a second edge of the block;

the second correction data includes: a maximum value of a value calculated based on characteristic data of the light emitting element of the block; and a maximum element number to show the identification number of the light emitting element corresponding to the maximum value, the method further comprising:

correcting the first correction data corresponding to the light emitting element included in the block from the first edge element number to the second edge element number based on the maximum value, the maximum element number, the first edge element number and the second edge element number.

15. The light intensity correction method of claim 14, wherein the adjustment instruction information includes an adjustment value to change the maximum value to the maximum value or less, the method further comprising:

adjusting the second correction data according to the adjustment value.

16. The light intensity correction method of claim 15, further comprising:
dividing the block into a plurality of blocks according to the maximum value based on the block information, the maximum value and the maximum element number;
setting a correction amount to correct the first correction data of the light emitting element included in the block with respect to each of the divided blocks; and
changing the correction amount with respect to each of the divided blocks according to the adjustment value.

* * * * *